US008856817B2

(12) United States Patent
Sinha et al.

(10) Patent No.: US 8,856,817 B2
(45) Date of Patent: Oct. 7, 2014

(54) METHOD AND SYSTEM FOR IMPLEMENTATION OF RULES FOR OVERLAYS BASED ON AUTOMATIC CONTENT RECOGNITION

(71) Applicant: Turner Broadcasting System, Inc., Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 13/730,495

(22) Filed: Dec. 28, 2012

(65) Prior Publication Data

US 2013/0205335 A1      Aug. 8, 2013

Related U.S. Application Data

(60) Provisional application No. 61/596,012, filed on Feb. 7, 2012.

(51) Int. Cl.
*H04N 7/173*        (2011.01)
(Continued)

(52) U.S. Cl.
CPC ..... *H04N 21/44008* (2013.01); *H04N 21/4784* (2013.01); *H04N 21/4722* (2013.01); *H04N 21/812* (2013.01); *H04N 21/478* (2013.01); *G06T 1/0021* (2013.01); *H04N 21/435* (2013.01); *G06F 17/30495* (2013.01); *H04N 21/441* (2013.01); *H04N 21/442* (2013.01); *G06F 3/0484* (2013.01)
USPC ............................................. 725/19; 725/20

(58) Field of Classification Search
USPC ...................................................... 725/19, 20
See application file for complete search history.

(56) References Cited

U.S. PATENT DOCUMENTS

| 5,410,326 A | 4/1995 | Goldsetin |
| 5,437,050 A | 7/1995 | Lamb et al. |

(Continued)

FOREIGN PATENT DOCUMENTS

| EP | 1485815 | 10/2007 |
| EP | 1354276 | 12/2007 |

(Continued)

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.

(Continued)

*Primary Examiner* — Pankaj Kumar
*Assistant Examiner* — Reuben M Brown
(74) *Attorney, Agent, or Firm* — Arent Fox LLP

(57) ABSTRACT

An automatic content recognition (ACR)-enabled connected TV device may be operable to present, utilizing an ACR system, an overlay during presentation of content, based on one or more rules. The one or more rules may be implemented utilizing information provided by the ACR system. The presented overlay may be associated with a sponsor, and the one or more rules may comprise a timing rule, an advertisement separation rule, an advertisement conflict rule and/or an auto-scaling rule. An ad server coupled to the ACR system may determine whether the overlay associated with the sponsor may be appropriate for presentation. The presented overlay may comprise interactive content for viewer interaction, and the one or more rules may comprise a viewer interaction rule which ensures that, when the interactive overlay is presented, the presented content may be scaled so that the scaled presented content is not covered by the overlay.

21 Claims, 13 Drawing Sheets

(51) Int. Cl.

| | | |
|---|---|---|
| *H04N 5/445* | (2011.01) | |
| *H04N 21/44* | (2011.01) | |
| *H04N 21/4784* | (2011.01) | |
| *H04N 21/4722* | (2011.01) | |
| *H04N 21/81* | (2011.01) | |
| *H04N 21/478* | (2011.01) | |
| *G06T 1/00* | (2006.01) | |
| *H04N 21/435* | (2011.01) | |
| *G06F 17/30* | (2006.01) | |
| *H04N 21/441* | (2011.01) | |
| *H04N 21/442* | (2011.01) | |
| *G06F 3/0484* | (2013.01) | |
| *G06F 15/16* | (2006.01) | |

(56) References Cited

U.S. PATENT DOCUMENTS

| | | | |
|---|---|---|---|
| 5,874,686 | A | 2/1999 | Ghias et al. |
| 5,918,223 | A | 6/1999 | Blum et al. |
| 5,956,683 | A | 9/1999 | Jacobs et al. |
| 5,991,737 | A | 11/1999 | Chen |
| 6,121,530 | A | 9/2000 | Sonoda |
| 6,184,877 | B1 | 2/2001 | Dodson et al. |
| 6,201,176 | B1 | 3/2001 | Yourlo |
| 6,314,577 | B1 | 11/2001 | Pocock |
| 6,408,272 | B1 | 6/2002 | White et al. |
| 6,504,089 | B1 | 1/2003 | Negishi et al. |
| 6,556,218 | B1 | 4/2003 | Alcorn |
| 6,760,720 | B1 | 7/2004 | De Bellis |
| 6,765,595 | B2 | 7/2004 | Lee et al. |
| 6,834,308 | B1 | 12/2004 | Ikezoye et al. |
| 6,968,337 | B2 | 11/2005 | Wold |
| 6,990,453 | B2 | 1/2006 | Wang et al. |
| 7,080,325 | B2 | 7/2006 | Treibach-Heck et al. |
| 7,174,293 | B2 | 2/2007 | Kenyon et al. |
| 7,190,971 | B1 | 3/2007 | Kawamoto |
| 7,194,752 | B1 | 3/2007 | Kenyon et al. |
| 7,266,343 | B1 | 9/2007 | Yli-juuti et al. |
| 7,363,278 | B2 | 4/2008 | Schmelzer et al. |
| 7,444,353 | B1 | 10/2008 | Chen et al. |
| 7,500,007 | B2 | 3/2009 | Ikezoye et al. |
| 7,529,659 | B2 | 5/2009 | Wold |
| 7,562,012 | B1 | 7/2009 | Wold et al. |
| 7,562,392 | B1 | 7/2009 | Rhoads et al. |
| 7,565,327 | B2 | 7/2009 | Schmelzer |
| 7,707,088 | B2 | 4/2010 | Schmelzer |
| 7,711,652 | B2 | 5/2010 | Schmelzer |
| 7,783,489 | B2 | 8/2010 | Kenyon et al. |
| 7,797,249 | B2 | 9/2010 | Schmelzer et al. |
| 7,870,574 | B2 | 1/2011 | Kenyon et al. |
| 7,877,438 | B2 | 1/2011 | Schrempp et al. |
| 7,917,645 | B2 | 3/2011 | Ikezoye et al. |
| 8,006,274 | B2 * | 8/2011 | Scott, III ............... 725/89 |
| 8,117,635 | B2 * | 2/2012 | Hendricks et al. ........ 725/34 |
| 8,249,422 | B2 | 8/2012 | Narahara et al. |
| 8,418,206 | B2 | 4/2013 | Bryant et al. |
| 8,553,148 | B2 | 10/2013 | Ramaswamy et al. |
| 2002/0083060 | A1 | 6/2002 | Wang et al. |
| 2003/0035075 | A1 * | 2/2003 | Butler et al. ............. 348/734 |
| 2003/0055699 | A1 | 3/2003 | O'Connor |
| 2004/0034874 | A1 | 2/2004 | Hord et al. |
| 2004/0068737 | A1 | 4/2004 | Itoh et al. |
| 2006/0026636 | A1 | 2/2006 | Stark et al. |
| 2006/0031684 | A1 | 2/2006 | Sharma et al. |
| 2007/0192784 | A1 | 8/2007 | Postrel |
| 2008/0104634 | A1 | 5/2008 | Gajdos et al. |
| 2008/0305815 | A1 | 12/2008 | McDonough |
| 2008/0310731 | A1 | 12/2008 | Stojancic et al. |
| 2008/0313140 | A1 | 12/2008 | Pereira et al. |
| 2009/0064261 | A1 | 3/2009 | Jung |
| 2009/0094637 | A1 * | 4/2009 | Lemmons ............... 725/32 |
| 2009/0106104 | A1 | 4/2009 | Upendran et al. |
| 2009/0133049 | A1 | 5/2009 | Bradley |
| 2009/0150930 | A1 * | 6/2009 | Sherwin et al. ......... 725/35 |
| 2009/0317053 | A1 | 12/2009 | Morley et al. |
| 2009/0318114 | A1 | 12/2009 | Bertoni |
| 2010/0007797 | A1 | 1/2010 | Stojancic |
| 2010/0095337 | A1 | 4/2010 | Dua |
| 2010/0121691 | A1 * | 5/2010 | Shifflett et al. .......... 705/14.4 |
| 2010/0162344 | A1 | 6/2010 | Casagrande et al. |
| 2010/0205628 | A1 | 8/2010 | Davis et al. |
| 2010/0303338 | A1 | 12/2010 | Stojancic et al. |
| 2010/0306193 | A1 | 12/2010 | Pereira et al. |
| 2010/0318515 | A1 | 12/2010 | Ramanathan et al. |
| 2011/0067046 | A1 | 3/2011 | Cox et al. |
| 2011/0078729 | A1 | 3/2011 | Lajoie et al. |
| 2011/0088063 | A1 | 4/2011 | Ben-Romdhane et al. |
| 2011/0177775 | A1 | 7/2011 | Gupta et al. |
| 2011/0191806 | A1 | 8/2011 | Knudson et al. |
| 2011/0283327 | A1 | 11/2011 | Zhu |
| 2011/0289114 | A1 * | 11/2011 | Yu et al. ............... 707/769 |
| 2011/0311095 | A1 | 12/2011 | Archer |
| 2011/0313856 | A1 | 12/2011 | Cohen et al. |
| 2012/0054848 | A1 * | 3/2012 | Salowey et al. ........... 726/10 |
| 2012/0246693 | A1 | 9/2012 | Iqbal |
| 2013/0019262 | A1 * | 1/2013 | Bhatia et al. ............ 725/34 |
| 2013/0125163 | A1 | 5/2013 | Chen et al. |
| 2013/0132999 | A1 | 5/2013 | Pandey |

FOREIGN PATENT DOCUMENTS

| | | |
|---|---|---|
| JP | 11055201 | 2/1999 |
| WO | WO9517746 | 6/1995 |

OTHER PUBLICATIONS

Blackburn, Steven G., "Search by Humming," University of Southampton Faculty of Engineering, Department of Electronics and Computer Science, May 8, 1997.

Ghias, Asif et al., "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call *CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

* cited by examiner

METHOD AND SYSTEM FOR IMPLEMENTATION OF RULES FOR OVERLAYS BASED ON AUTOMATIC CONTENT RECOGNITION

CROSS-REFERENCE TO RELATED APPLICATIONS/INCORPORATION BY REFERENCE

This patent application makes reference to, claims priority to, and claims benefit from U.S. Provisional Application Ser. No. 61/596,012, which was filed on Feb. 7, 2012.

This application makes reference to:
U.S. patent application Ser. No. 13/730,359 filed on Dec. 28, 2012;
U.S. patent application Ser. No. 13/730,422 filed on Dec. 28, 2012;
U.S. patent application Ser. No. 13/730,459 filed on Dec. 28, 2012;
U.S. patent application Ser. No. 13/730,530 filed on Dec. 28, 2012;
U.S. patent application Ser. No. 13/730,754 filed on Dec. 28, 2012;
U.S. patent application Ser. No. 13/730,559 filed on Dec. 28, 2012;
U.S. patent application Ser. No. 13/730,579 filed on Dec. 28, 2012;
U.S. patent application Ser. No. 13/730,593 filed on Dec. 28, 2012;
U.S. patent application Ser. No. 13/730,759 filed on Dec. 28, 2012;
U.S. patent application Ser. No. 13/730,627 filed on Dec. 28, 2012;
U.S. patent application Ser. No. 13/730,644 filed on Dec. 28, 2012;
U.S. patent application Ser. No. 13/730,656 filed on Dec. 28, 2012;
U.S. patent application Ser. No. 13/730,670 filed on Dec. 28, 2012;
U.S. patent application Ser. No. 13/730,691 filed on Dec. 28, 2012;
U.S. patent application Ser. No. 13/730,702 filed on Dec. 28, 2012;
U.S. patent application Ser. No. 13/730,718 filed on Dec. 28, 2012; and
U.S. patent application Ser. No. 13/730,734 filed on Dec. 28, 2012.

FIELD OF THE INVENTION

Certain embodiments of the invention relate to content recognition. More specifically, certain embodiments of the invention relate to a method and system for implementation of rules for overlays based on automatic content recognition.

BACKGROUND OF THE INVENTION

Smart or connected televisions (TVs) may receive data from data networks such as Internet networks that allow a viewer to not only access broadcast digital content, but also receive multimedia content. With the proliferation of connected TVs and wireless communication devices such as smartphones and tablets, content or network providers now have a plethora of avenues for distributing media including programming, advertisements and interactive content.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for implementation of rules for overlays based on automatic content recognition, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
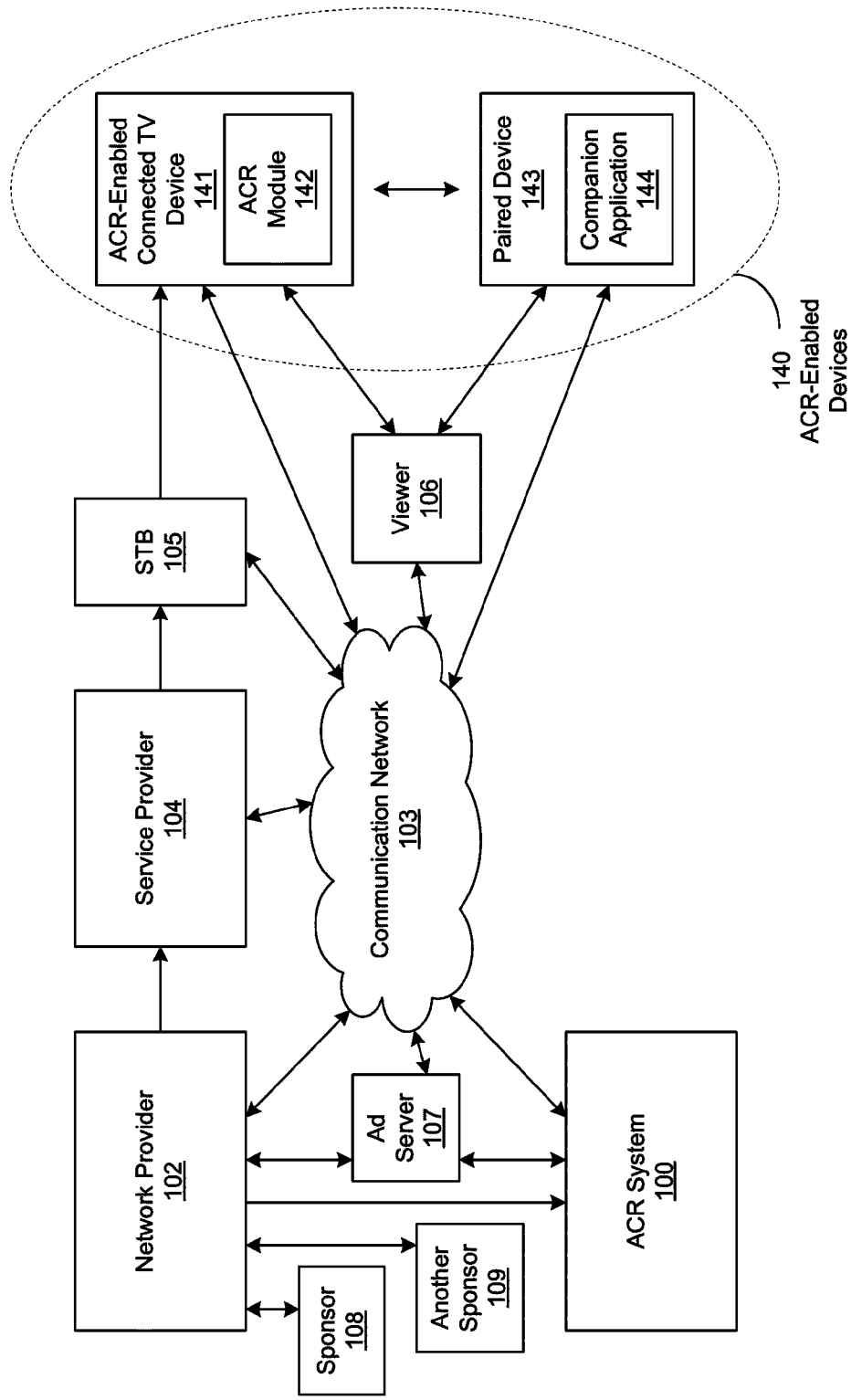
FIG. 1A is a block diagram illustrating an exemplary communication system, in accordance with an embodiment of the invention.

Certain embodiments of the invention can be found in a method and system for implementation of rules for overlays based on automatic content recognition. In various embodiments of the invention, an automatic content recognition (ACR)-enabled connected TV device may be operable to present, utilizing an ACR system, an overlay during presentation of content, based on one or more rules. In this regard, the one or more rules may be implemented utilizing information provided by the ACR system. In instances when the ACR-enabled connected TV device is paired with or associated with a paired device utilizing a companion application running on the paired device, the content and the overlay may also be presented on the paired device.

In an exemplary embodiment of the invention, the presented overlay may be associated with a sponsor. In this regard, the one or more rules may comprise, for example, a timing rule, which ensures that, in instances when an up-coming advertisement is sponsored by the sponsor, the presented overlay may not be presented beyond the end of the up-coming advertisement. In other words the overlay is presented only for the duration of the corresponding advertisement. The one or more rules may comprise, for example, an advertisement separation rule, which indicates whether to present the overlay associated with the sponsor based on a competing advertisement that is sponsored by another sponsor and is scheduled to be presented in a commercial break within a certain or a specified time period. The one or more rules may comprise, for example, an advertisement conflict rule, which ensures that, in instances when the presented content comprises a competing advertisement sponsored by another sponsor during a commercial break, the overlay associated with the sponsor may be blocked from being presented during the commercial break. The one or more rules may also comprise, for example, an auto-scaling rule which ensures that, in instances when the overlay associated with the sponsor is presented into a commercial break during which a competing advertisement sponsored by another sponsor is presented, the competing advertisement may be scaled, based on the overlay, so that the scaled competing advertisement is not covered by the overlay. Additionally, information that corresponds to the sponsor may be removed from the overlay to avoid presenting competing messages during the commercial break.

In some embodiments of the invention, an ad server coupled to the ACR system may be operable to determine that the overlay associated with the sponsor may be appropriately presented. The ad server may make the determination based on the one or more rules and on one or more advertising schedules for commercial breaks.

In an exemplary embodiment of the invention, the presented overlay may comprise interactive content for viewer interaction. In this regard, the one or more rules may comprise, for example, a viewer interaction rule which ensures that, in instances when the overlay comprising the interactive content is presented, the presented content may be scaled, based on the overlay, so that the scaled presented content is not covered by the overlay. To implement the viewer interaction rule, the ACR-enabled connected TV device may be operable to identify, utilizing the ACR system, certain portion of the presented content that may be covered by the overlay. In instances when the overlay is presented, the ACR-enabled connected TV device may be operable to scale the presented content, based on the identification, so that the scaled presented content is not covered by the presented overlay. In instances when the presented overlay ends, the ACR-enabled connected TV device may be operable to rescale the scaled presented content back to its original size.

FIG. 1A is a block diagram illustrating an exemplary communication system, in accordance with an embodiment of the invention. Referring to FIG. 1A, there is shown an ACR system 100, a network provider 102, a communication network 103, a service provider 104, a set-top box (STB) 105, an ad server 107, a sponsor 108, another sponsor 109 and ACR-enabled devices 140. The ACR-enabled devices 140 may comprise an ACR-enabled connected TV device 141 and a paired device 143. The ACR-enabled connected TV device 141 may comprise an ACR module 142. The paired device 143 may comprise a companion application 144.

The ACR system 100 may comprise suitable logic, circuitry, interfaces and/or code that may be operable to support automatic content recognition operations in the ACR-enabled devices 140 such as the ACR-enabled connected TV device 141. The ACR system 100 may provide automatic content recognition applications and/or services to the ACR-enabled devices 140. The ACR system 100 may support a plurality of automatic content recognition technologies and may provide appropriate synchronization to the ACR-enabled connected TV device 141 and/or to the corresponding paired device 143. For example, the ACR system 100 may implement an abstraction layer to support a plurality of different fingerprinting technologies for the automatic content recognition. In this regard, the ACR system 100 may utilize fingerprints to identify content. More details of the operation of the ACR system 100 may be described below with respect to, for example, FIGS. 1B, 2A-2C.

In an exemplary embodiment of the invention, the ACR system 100 may be operable to support implementation of one or more rules for presenting overlays on the ACR-enabled devices 140. The ACR system 100 may provide, for example, information to the ad server 107 for supporting the operations of the ad server 107.

The network provider 102 may comprise suitable logic, circuitry, interfaces and/or code that may be operable to generate, capture and/or package content such as TV programming or multimedia content that may be distributed to display devices such as the ACR-enabled devices 140. For example, the content may be distributed to the ACR-enabled connected TV device 141 via the service provider 104 and the STB 105 or via the communication network 103. In an exemplary embodiment of the invention, the network provider 102 may provide content to the ACR system 100 for supporting the automatic content recognition operation.

The communication network 103 may comprise suitable logic, circuitry, interfaces and/or code that may be operable to provide communication among a plurality of entities via various wire-line and/or wireless technologies such as, for example, T1/E1, DSL, cable modem, FTTx, PLC and/or WiMAX. The communication network 103 may comprise, for example, Internet and/or another multimedia network.

The service provider 104 may comprise suitable logic, circuitry, interfaces and/or code that may be operable to provide services using different access technologies to display devices such as the ACR-enabled devices 140. For example, the service provider 104 may provide connections to the ACR-enabled connected TV device 141 via the STB 105. Such connections may be utilized by the ACR-enabled connected TV device 141 to access content provided by the network provider 102.

The STB 105 may comprise suitable logic, circuitry, interfaces and/or code that may be operable to connect a display device such as the ACR-enabled connected TV device 141 to an external source of signals, such as the service provider 104, and to convert those signals into content that may be displayed on the screen of the ACR-enabled connected TV device 141. The STB 105 may be operable to provide processing associated with managing, delivering, and/or storing video content that may be displayed on the ACR-enabled connected TV device 141.

The ACR-enabled connected TV device 141 may comprise suitable logic, circuitry, interfaces and/or code that may be operable to receive content for presenting to a viewer such as the viewer 106. The content may comprise interactive content for the viewer 106 to interact. In addition to receiving content via the service provider 104 and the STB 105, the ACR-enabled connected TV device 141 may receive content from Internet via the communication network 103. In an exemplary embodiment of the invention, the ACR-enabled connected TV device 141 may comprise an ACR module 142. The ACR module 142 may comprise suitable logic, circuitry, interfaces and/or code that may be operable to provide automatic content recognition functions for the ACR-enabled connected TV device 141. The ACR module 142 may communicate with the ACR system 100, via the communication network 103, to support the automatic content recognition operations of the ACR-enabled connected TV device 141. For example, the ACR module 142 may support the automatic content recognition operations on video content provided by the network provider 102 via the service provider 104, or on video content being played back from a digital video recorder (DVR) or similar device.

The ACR module 142 may, for example, provide fingerprints to the ACR system 100 for matching. The ACR module 142 may receive ACR related information or content from the ACR system 100, for example. The ACR module 142 may be operable to run or execute a synchronous event manager to monitor events that occur internal to the ACR-enabled connected TV device 141 and/or events from sources external to the ACR-enabled connected TV device 141. The synchronous event manager may be run as a background process that may be transparent to the user. The synchronous event manager may be executed continuously during those periods where monitoring is to take place. An example of events from external sources may include, but need not be limited to, an overlay event corresponding to an automatic content recognition match. Examples of internal events may include, but need not be limited to, a process, an application, and/or a function corresponding to the automatic content recognition performed by the ACR-enabled connected TV device 141. In response to detected event triggers, the synchronous event manager may request and receive applications, such as user-interaction applications, which may be executed to produce interactive opportunities that may be presented to a viewer such as the viewer 106, for example. The synchronous event manager may be implemented, for example, in software, firmware and/or hardware.

In an exemplary embodiment of the invention, the ACR module 142 may be operable to present, utilizing the ACR system 100, an overlay during presentation of content, based on one or more rules. For example, the ACR module 142 may present an overlay, which may be associated with a sponsor such as the sponsor 108. In this regard, the overlay may be presented based on, for example, a timing rule, an advertisement separation rule, an advertisement conflict rule and/or an auto-scaling rule. The ACR module 142 may also present, for example, an overlay, which may comprise interactive content for viewer interaction such as for the viewer 106 to interact. In this regard, the overlay may be presented based on, for example, a viewer interaction rule. In such instances, the ACR module 142 may be operable to identify, utilizing the ACR system 100, a certain portion of the presented content that is to be covered by the overlay. In instances when the overlay is presented, the ACR module 142 may be operable to scale the presented content, based on the identification, so that the scaled presented content is not covered by the presented overlay. In instances when the presented overlay ends, the scaled presented content may be rescaled back to its original size by the ACR module 142. More details of the timing rule, the advertisement separation rule, the advertisement conflict rule, the auto-scaling rule and the viewer interaction rule may be described below with respect to, for example, FIGS. 4-8

The paired device 143 may comprise suitable logic, circuitry, interfaces and/or code that may be operable to pair with the ACR-enabled connected TV device 141 for automatic content recognition operations, including but not limited to second screen operations. Communication between the ACR-enabled connected TV device 141 and the paired device 143 may occur via a wireless communication protocol such as, for example, near field communication (NFC). The paired device 143 may pair with the ACR-enabled connected TV device 141 utilizing the companion application 144 downloaded in the paired device 143. For example, the companion application 144 may comprise a sync application downloaded in the paired device 143 from the ACR-enabled connected TV device 141. The paired device 143 may comprise, for example, a tablet, a laptop and/or a smartphone.

The ad server 107 may comprise suitable logic, circuitry, interfaces and/or code that may be operable to support the implementation of one or more rules for presenting overlays on the ACR-enabled devices 140. In an exemplary embodiment of the invention, the ad server 107 may be operable to provide information for determining whether an overlay associated with a sponsor is appropriate to present, based on the one or more rules and on one or more advertising schedules for commercial breaks.

In operation, the ACR-enabled connected TV device 141 may be operable to present content. The content may be provided or associated with a network provider such as the network provider 102. The ACR module 142 in the ACR-enabled connected TV device 141 may be operable to present, utilizing the ACR system 100, an overlay during presentation of content, based on one or more rules. In this regard, the one or more rules may be implemented utilizing information provided by the ACR system 100. In instances when the ACR-enabled connected TV device 141 is paired with or associated with the paired device 143 utilizing the companion application 144 downloaded in and running on the paired device 143, the content and the overlay may also be presented on the paired device 143.

In an exemplary embodiment of the invention, the presented overlay may be associated with the sponsor 108. In this regard, the one or more rules may comprise, for example, a timing rule which ensures that, in instances when an up-coming advertisement is sponsored by the sponsor 108, the presented overlay may not extend beyond the end of the up-coming advertisement. The one or more rules may comprise, for example, an advertisement separation rule, which indicates whether to present the overlay associated with the sponsor 108 based on a competing advertisement, which is sponsored by another sponsor 109, and is scheduled to be presented in a commercial break within a certain or a specified time period. The one or more rules may comprise, for example, an advertisement conflict rule which ensures that, in instances when the presented content comprises a competing advertisement sponsored by another sponsor 109 during a commercial break, the overlay associated with the sponsor 108 may not be allowed to be presented during the commercial break. The one or more rules may also comprise, for example, an auto-scaling rule which ensures that, in instances when the overlay associated with the sponsor 108 stays up or is displayed into a commercial break during which a competing advertisement sponsored by another sponsor 109 is presented, the competing advertisement may be scaled, based on the overlay, so that the scaled competing advertisement is not covered by the overlay. Furthermore, information indicating the sponsor 108 may be removed from the overlay to avoid presenting competing messages during the commercial break.

In some embodiments of the invention, the ad server 107, which may be coupled to the ACR system 100, may be operable to determine whether the overlay associated with the sponsor 108 may be appropriate for presentation. In this regard, the ad server 107 may provide the determination based on the one or more rules and on one or more advertising schedules for commercial breaks.

In an exemplary embodiment of the invention, the presented overlay may comprise interactive content for viewer interaction such as, for example, for the viewer 106 to interact. In this regard, the one or more rules may comprise, for example, a viewer interaction rule which ensures that, in instances when the overlay comprising the interactive content is presented, the presented content may be scaled, based on the overlay, so that the scaled presented content is not covered by the overlay. To implement the viewer interaction rule, the ACR module 142 in the ACR-enabled connected TV device 141 may be operable to identify, utilizing the ACR system 100, a certain portion of the presented content that is to be covered by the overlay. In instances when the overlay is presented, the ACR module 142 in the ACR-enabled connected TV device 141 may be operable to scale the presented content, based on the identification, so that the scaled presented content is not covered by the presented overlay. In instances when the presented overlay ends, the ACR module 142 in the ACR-enabled connected TV device 141 may be operable to rescale the scaled presented content back to its original size.

Figure 1B:
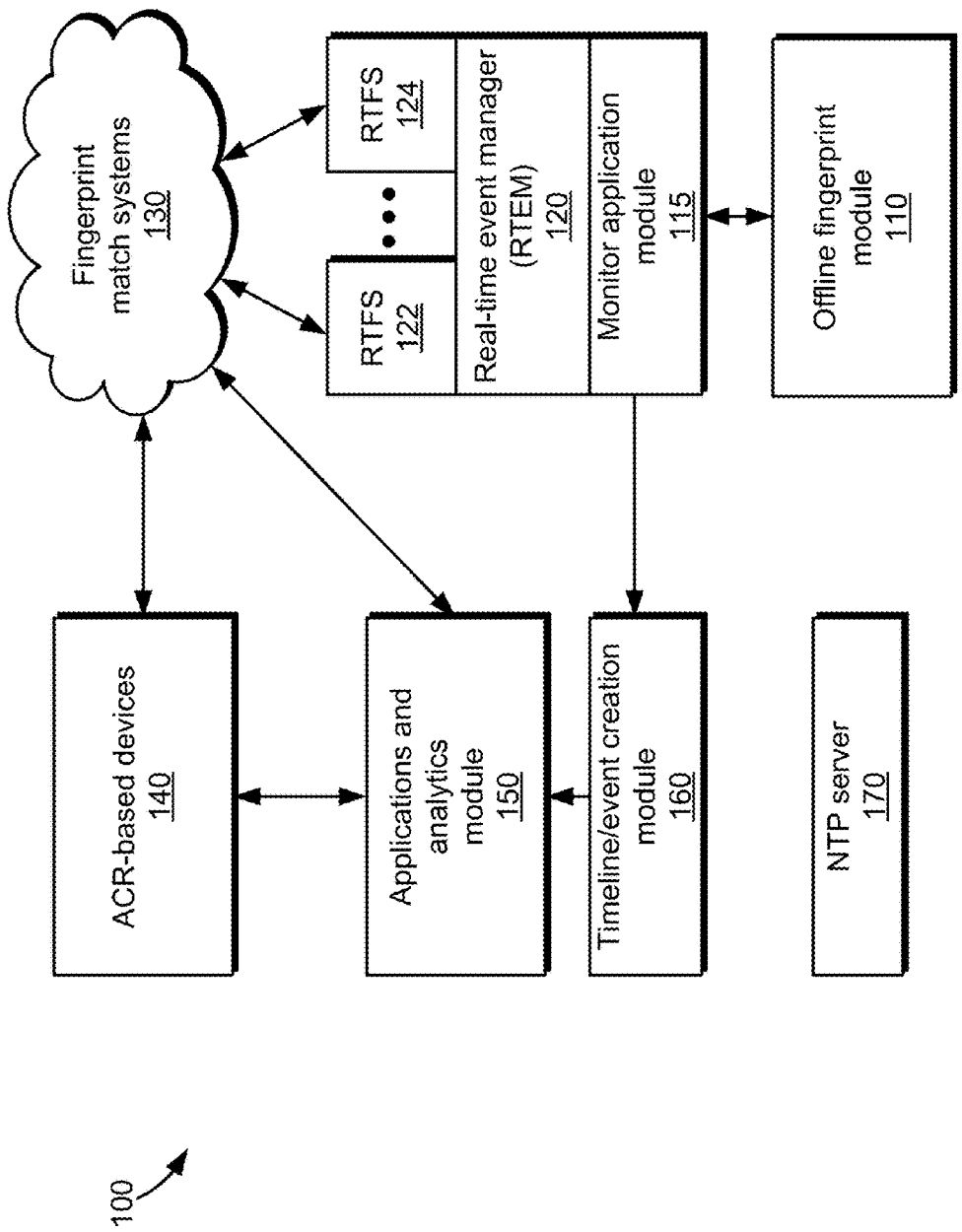
FIG. 1B is a high-level block diagram illustrating an exemplary automatic content recognition system with an abstraction layer, in accordance with an embodiment of the invention.

FIG. 1B is a high-level block diagram illustrating an exemplary automatic content recognition system with an abstraction layer, in accordance with an embodiment of the invention. Referring to FIG. 1B, there is shown an ACR system 100 that implements an abstraction layer to support fingerprinting technology from multiple vendors. The ACR system 100 is operable to support fingerprinting technology from multiple vendors and may be utilized to identify a network television station that provides content for display on a viewing screen based on the logo, symbol, sign, watermark, and/or text that are typically utilized to represent the network television station.

The ACR system 100 may comprise an offline fingerprint module 110, a monitor application module 115, a real-time event manager (RTEM) 120, a plurality of RTFSs 122, . . . , 124, fingerprint match systems 130, end-user devices 140, an applications and analytics module 150, and a timeline/event creation module 160. In some instances, at least some of the functions of the monitor application module 115 and of the RTEM 120 may be combined and may be provided by a common device or component of the ACR system 100.

The ACR system 100 may also comprise an NTP server 170 that is operable to provide synchronization to various parts of the ACR system 100 via a common reference clock. For example, the NTP server 170 may be operable to synchronize the operation of the RTEM 120 with the operation of the RTFSs 122, . . . , 124. The operations of the NTP server 170 may be based on, for example, the Internet Engineering Task Force (IETF) RFC 5905 "Network Time Protocol Version 4: Protocol and Algorithms Specification."

The offline fingerprint module 110 may comprise suitable logic, circuitry, code, and/or interfaces that may be operable to handle the offline fingerprinting portion of the operations performed by the ACR system 100. The offline fingerprint module 100 may be operable to receive pre-recorded or offline content such as commercials, programs, and promotions, for example. In this regard, the offline fingerprint module 100 may be able to ingest and process content with defined interactivity. The monitor application module 115 may comprise suitable logic, circuitry, code, and/or interfaces that may be operable to process a network television feed and the content handled by the offline fingerprint module 110 to create a real-time timeline and/or real-time event triggers. During the process, the monitor application module 115, and/or the timeline/event creation module 160, may interact with backend analytics databases that comprise user-engagement data, for example. Some of the operations that may be performed by the offline fingerprint module 110 may comprise, for example, ingest operations, storage operations, monitoring operations, and/or content version comparison operations.

The RTEM 120 may comprise suitable logic, circuitry, code, and/or interfaces that may be operable to manage real-time events based on inputs provided by one or more sources. For example, the RTEM 120 may be operable to manage real-time events based on events stored in an interactive timeline archive, a network schedule, and/or those provided by an interactive director that may assign interactive event IDs to live programming as the network television feed is being fingerprinted in real time. Moreover, the RTEM 120 may be operable to trigger interactive events in legacy systems and/or in web-based systems. The RTEM 120 may be referred to as a real-time event trigger infrastructure, for example. The RTEM 120 may comprise a real-time event inserter (RTEI) (not shown), which is operable to insert the events into the RTFSs 122 . . . 124.

In accordance with an embodiment of the invention, the RTEM 120 may be operable to instruct the monitor application module 115, and/or the timeline/event creation module 160 to record the fingerprints associated with a live program as well as to store the corresponding set of events created during the live program in the interactive timeline archive. This enables playback of the program with interactivity even after expiration of the corresponding fingerprints in the vendor's third party database. This may occur in instances when there is a re-broadcast of the live event at a subsequent date. In the case of timeline based devices, the events may be stored and timeline retrieval may be enabled even during the active window of the corresponding fingerprints since there will be no available event-to-fingerprint association.

In accordance with an embodiment of the invention, the RTEM 120 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the Real-time event manager 120 may be operable to generate one or more signals that provide instructions to the RTFSs 122, . . . , 124 to enable the identification of a network television station based on the logo, symbol, sign, watermark, and/or text that are typically utilized to represent the network television station. The instructions may be related to information that is to be generated and/or provided to the end-user devices 140 for network television station identification. The instructions may indicate the type of information that is to be provided to the end-user devices 140 and/or when such information is to be provided. In some instances, a portion of the ACR system 100 other than the Real-time event manager 120, or in conjunction with the Real-time event manager 120, may generate the signals for providing instructions to the RTFSs 122, ..., 124.

The RTFSs 122, ..., 124 may comprise suitable logic, circuitry, code, and/or interfaces that may be operable to handle fingerprinting and fingerprint communications to the fingerprint match systems 130. Since each vendor or television manufacturer is likely to utilize its own fingerprint technology, each of the RTFSs 122, ..., 124 may be a dedicated server for each of the fingerprint technologies supported by the ACR system 100. In some embodiments of the invention, a portion of the RTFSs 122, ..., 124 may be operable to perform video fingerprinting while the remaining portion of the RTFSs 122, ..., 124 may be operable to perform audio fingerprinting or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the RTFSs 122, ..., 124 may be operable to receive one or more signals from the Real-time event manager 120 and/or from another portion of the ACR system 100 to enable the identification of a network television station based on the logo, symbol, sign, watermark, and/or text that are typically utilized to represent the network television station. The instructions may be utilized to determine and/or provide locations to the end-user devices 140 to take fingerprints of the video content being displayed on a viewing screen. In some instances, at least a portion of the fingerprinting locations may be provided by the Real-time event manager 120 and/or by another portion of the ACR system 100 through the instructions received by the RTFSs 122, ..., 124. In other instances, the fingerprinting locations may be determined by the RTFSs 122, ..., 124 based on locally and/or remotely stored information. Each fingerprinting location may comprise coordinates in a video frame (e.g., x coordinates, y coordinates) that indicate a particular region in the video frame to fingerprint.

The RTFSs 122, ..., 124 may provide the fingerprinting locations for communication to the end-user devices 140, for example, in the form of fingerprint profiles. The fingerprint profiles may comprise fingerprinting locations and/or other information to be utilized by an end-user device for ACR fingerprinting. In some instances, the fingerprint profiles may be generated by the RTFSs 122, ..., 124 in response to the instructions received. In other instances, the fingerprint profiles comprising the fingerprinting locations may be received by the RTFSs 122, ..., 124 from the Real-time event manager 120 and/or from another portion of the ACR system 100. The fingerprint profile of a particular end-user device 140 may be updated based on an indication that additional and/or different locations may be needed during fingerprinting to identify the network television station logo or symbol being displayed on a viewing screen at the end-user device 140. The update may be generated by the corresponding RTFS and then communicated to the end-user device 140 or may be received by the corresponding RTFS from the Real-time event manager 120 and/or from another portion of the ACR system 100 and then communicated to the end-user device 140.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 140. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the RTFSs 122, ..., 124 may be operable to communicate fingerprint profiles and/or fingerprint profile updates to the end-user devices 140 through the fingerprint match systems 130. Feedback and/or queries from the end-user devices 140 may be received by the RTFSs 122, ..., 124 for processing. The RTFSs 122, ..., 124 may in turn communicate information corresponding to the feedback and/or queries from the end-user devices 140 to the Real-time event manager 120 and/or to another portion of the ACR system 100 for further processing.

The fingerprint match systems 130 may comprise suitable logic, circuitry, code, and/or interfaces that may be operable to enable hosted services in the Internet for matching fingerprints produced by the RTFSs 122, ..., 124 with fingerprints produced by the end-user devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the end-user devices 140 with fingerprints provided by the RTFSs 122, ..., 124. When matches occur, the fingerprint match systems 130 may indicate that interactive events are to take place in the end-user devices 140. These interactive events may allow a viewer to be presented with information on the screen or display of an ACR-based device and to interact with the device based on the information presented.

The end-user devices 140 may comprise a plurality of devices such as connected TVs, connected TV with paired devices (e.g., tablets), and second screen devices such as smartphones and tablets, for example. The ACR-based devices may be referred to as end-user devices, for example. Since each of the fingerprint match systems 130 supports a different ACR or fingerprint technology, those end-user devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that supports the compatible fingerprint technology.

The end-user devices 140 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 140 may be operable to receive a series of fingerprint profiles and/or fingerprint profile updates and may be operable to adjust ACR fingerprinting accordingly.

The applications and analytics module 150 may comprise suitable logic, circuitry, code, and/or interfaces that may be operable to provide data to the end-user devices 140, determine what platforms are to be served and when these platforms are to be served, handle communications with third-party partners and advertisers, handle communication with backend analytics databases, and determine unique responses for a given device request (e.g., fix targeting).

The timeline/event creation module 160 may comprise suitable logic, circuitry, code, and/or interfaces that may be operable to produce a timeline of the content in a program or show based on information provided by the monitor application module 115. The timeline/event creation module 160 may then provide the timeline created to the applications and analytics module 150 to have the timeline disseminated to the appropriate End-user devices 140 that may not support event-to-fingerprint association. Once the End-user devices 140 have the timeline for a particular program or show, they may monitor the program or show, relative to the timeline, and launch appropriate event requests when a specified point in the timeline indicates that a particular event is to take place.

Communication between the RTFSs 122, . . . , 124, and the fingerprint match systems 130 may occur through one or more wireless and/or wireline communication links. Similarly, communications between the fingerprint match systems 130 and the end-user devices 140 and/or the applications and analytics module 150 may occur through one or more wireless and/or wireline communication links. The communication links described above may support one or more communication protocols. For example, communication protocols based on Internet Protocol (IP) may be typically used. Accordingly, the RTFSs 122, . . . , 124, the fingerprint match systems 130, and the applications and analytics module 150 may comprise suitable logic, circuitry, code, and/or interfaces to enable the use of the communication protocols.

In operation, the monitor application module 115 and/or the RTEM 120 may generate and/or handle event identifiers or event triggers that correspond to specific times in a program. These event identifiers may be generated from live programming, from a network schedule, or from information provided by the offline fingerprint module 110. The event identifiers may be assigned to the appropriate fingerprints generated by the RTFSs 122, . . . , 124. Since each RTFS relies on a different fingerprint technology, system synchronization is needed to appropriately assign the event identifiers to the right spot on a video and/or audio sequence. Such synchronization may be achieved by the use of a common reference clock provided by the NTP server 170.

Each of the RTFSs 122, . . . , 124 may communicate the event identifiers and the fingerprints to its corresponding one of the fingerprint match systems 130. The fingerprint match systems 130 in turn receive fingerprints from their corresponding end-user devices 140 and try to match those fingerprints to the ones received from their corresponding RTFSs 122, . . . , 124. When a match occurs, the event identifier and/or other information may be passed to the appropriate ACR-based device. With this information, the ACR-based device may obtain, for example, interactive information (e.g., graphics) from the applications and analytics module 150. For example, a connected TV may receive code or data specific for that device from a content management system (CMS) via a cloud-based content delivery network (CDN). There may be other actions performed by the user in connection with the interactive event and/or other information presented or produced in connection with the interactive event.

In operation, the ACR system 100 may generate a fingerprint profile that may be communicated to one of the end-user devices 140. The fingerprint profile may be communicated through one or more of the Real-time event manager 120, one of the RTFSs 122, . . . , 124, and one of the fingerprint match systems 130. The fingerprint profile may comprise locations where the end-user device is to take fingerprints of the video content being reproduced by the device. Once the content is identified based on the fingerprints taken and subsequently matched in the corresponding fingerprint match system 130, it may be determined that the source of the content is not known. Knowing the source of the content may be needed in some instances to enable interactive events associated with that source on the end-user device. Otherwise, an interactive event from, for example, one network television station may occur when a viewer is watching programming provided by a different network television station.

When the source of the content is not known, the end-user device may automatically utilize additional locations provided in the fingerprint profile or in a fingerprint profile update. These locations may correspond to the region in the video frame where the network television station logo or symbol is typically placed. Once these fingerprints are taken, they may be compared to fingerprints of the network television station logo or symbol at the corresponding fingerprint match systems 130. When a match occurs and the logo is identified, the end-user device may be able to receive interactive event identifiers from the corresponding RTFS. Once these interactive event identifiers are received, the end-user device may communicate with the applications and analytics module 150 to enable the interactive events to occur.

Figure 2A:
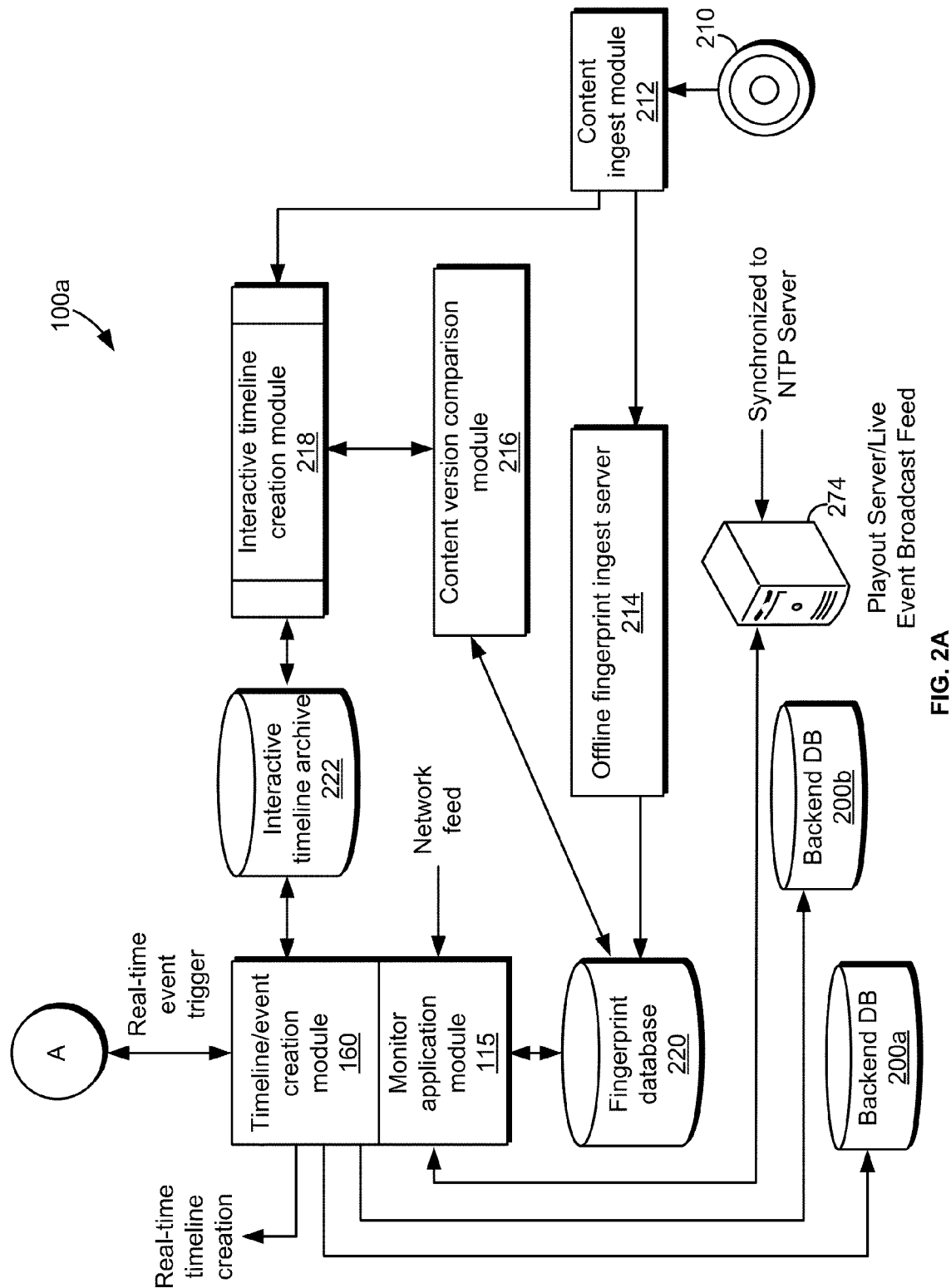
FIGS. 2A-2C are each a block diagram that illustrates details of the exemplary automatic content recognition system with an abstraction layer shown in FIG. 1B, in accordance with embodiments of the invention.
Figure 2B:
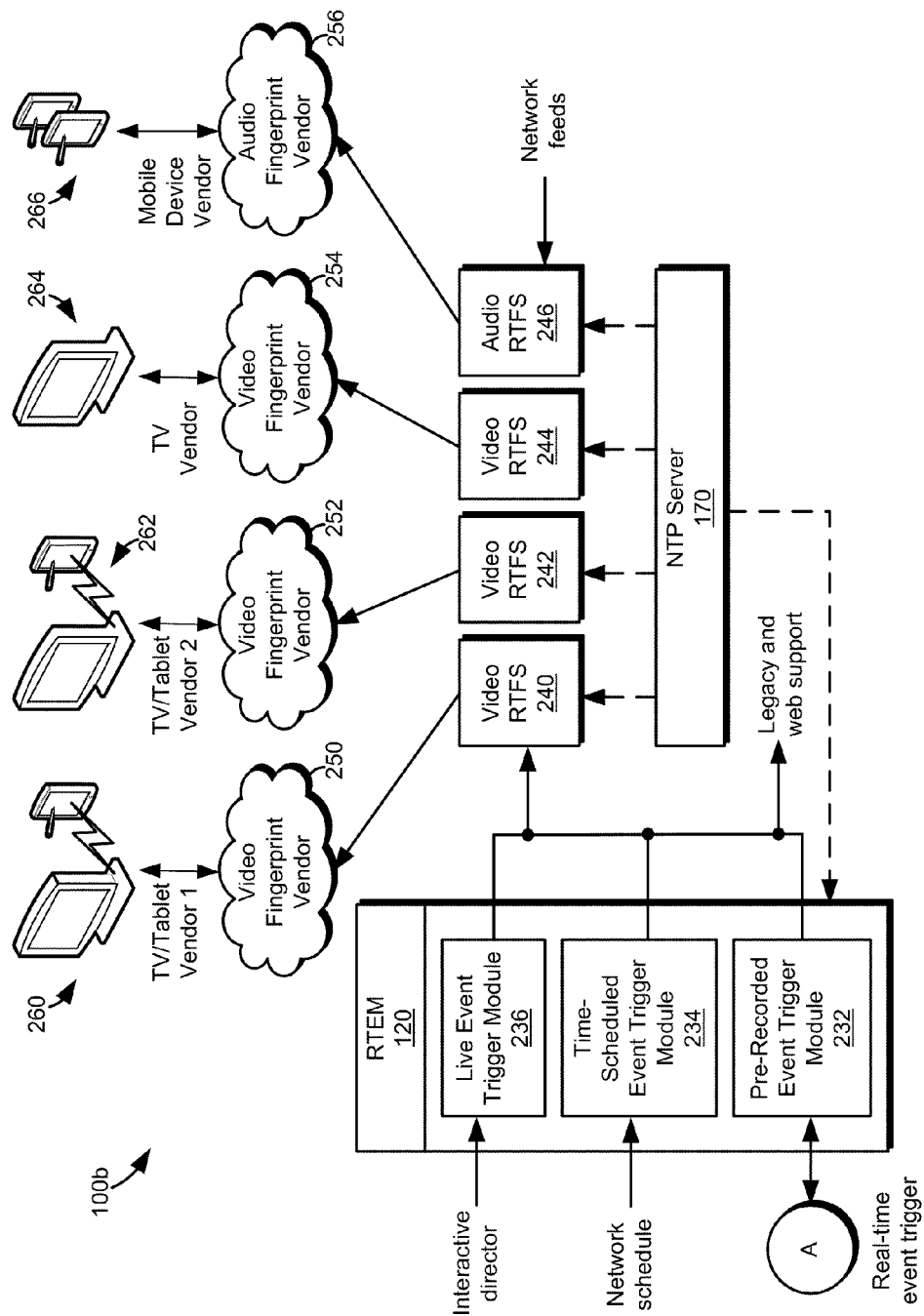
Figure 2C:
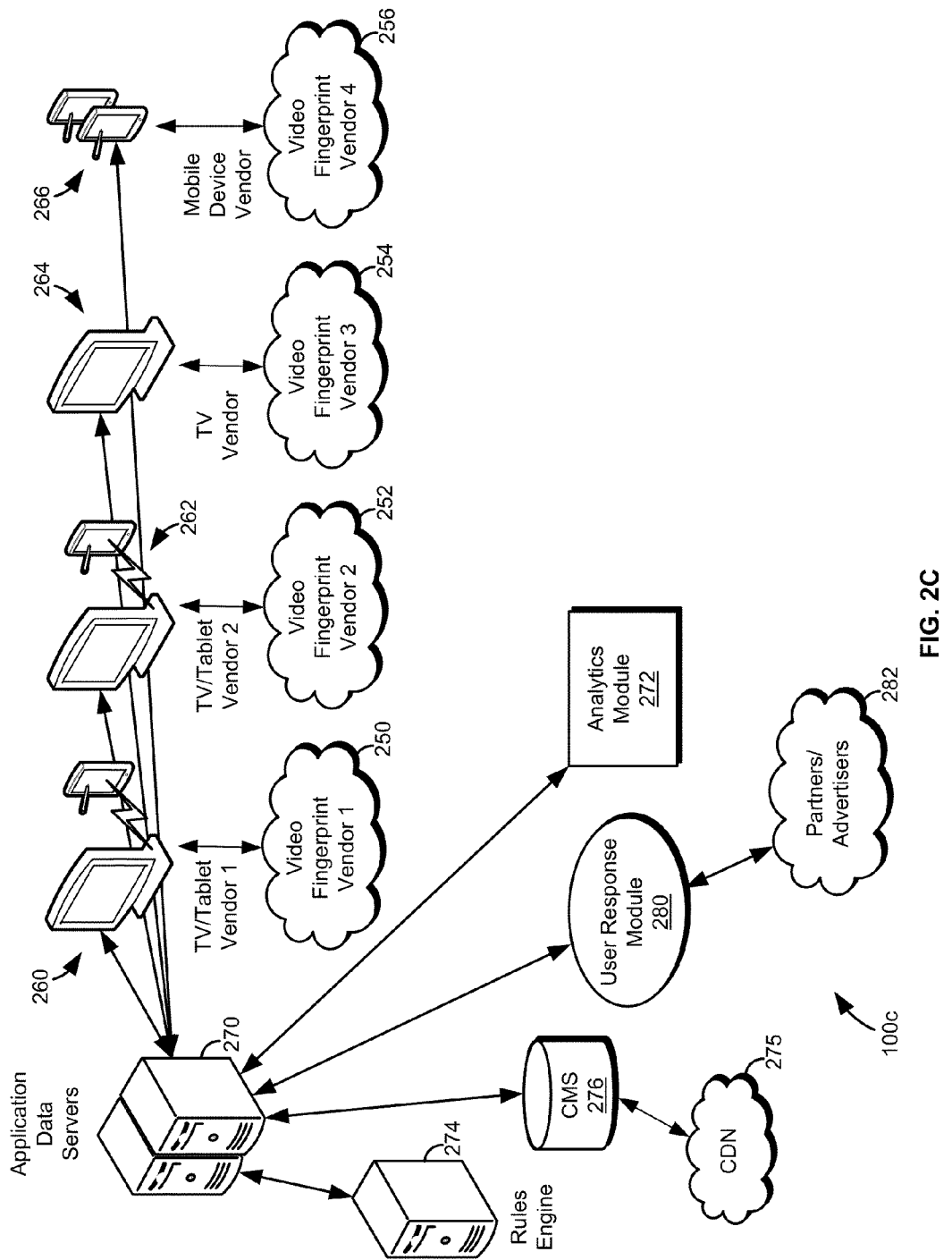

FIGS. 2A-2C are each a block diagram that illustrate details of the exemplary automatic content recognition system with abstraction layer shown in FIG. 1B, in accordance with embodiments of the invention. Referring to FIG. 2A, there is shown a portion 100*a* of the ACR system 100 that may substantially correspond to at least portions of the offline fingerprint module 110, the monitor application 115, and the timeline/event creation module 160 described above with respect to FIG. 1. The portion 100*a* may comprise a content ingest module 212, an offline fingerprint ingest server 214, a content version comparison module 216, and a fingerprint database 220. The portion 100*a* may also comprise an interactive timeline creation module 218, an interactive timeline archive 222, the monitor application module 115, and the timeline/event creation module 160. Also shown are backend databases (DB) 200*a* and 200*b* connected to the timeline/event creation module 160 and a playout server 274 connected to the monitor application module 115.

The content ingest module 212 may comprise suitable logic, circuitry, code, and/or interfaces that may be operable to receive a media master 210, also referred to as an air master, which may comprise one or more programs, commercials, and/or promotions, for example. The content ingest module 212 may be operable to generate or create a set of proxy videos by enciding the media master 210 utilizing different resolutions. The highest quality proxy video may be provided as an input to the offline fingerprint ingest server 214 while the lowest quality proxy video may be provide to the interactive timeline creation module 218. The content ingest module 212 may also provide a content ID (CID) and other associated metadata (e.g., program data, frame number) that corresponds to the content in the media master 210.

The offline fingerprint ingest server 214 may comprise suitable logic, circuitry, code, and/or interfaces that may be operable to use a fingerprint computation or algorithm to fingerprint content and subsequently push the fingerprints for archival in the fingerprint database 220. In the offline fingerprint ingest server 214, the highest quality proxy video created by the content ingest module 212 may be fingerprinted and may be associated with the content ID and corresponding related metadata. In this regard, the offline fingerprint ingest server 214 may utilize an API to automatically ingest the media files and associated metadata from the content ingest module 212. A graphical user interface (GUI) may also be supported to manually ingest media files and to enter associated metadata.

The offline fingerprint ingest server 214 may be operable to provide a management interface for the fingerprint database 220 and/or the content version comparison module 216. For example, an API may be utilized to remove content from the fingerprint database 220. A GUI may also be supported to manually remove content from the fingerprint database 220. The offline fingerprint ingest server 214 may be operable to set priorities regarding the content to be ingested and processed. Moreover, the offline fingerprint ingest server 214 may be operable to support, among other features, the use of administration tools and the creation of reports, the ability to generate progress reports on processing content and errors, and/or recoverability after a shut down or crash.

The offline fingerprint ingest server 214 may be implemented utilizing multiple modules (not shown). These modules may be operable to perform one or more functions. Examples of those functions may comprise, without limitation, receiving the content to be fingerprinted in an input or watch folder, receiving and assigning CIDs and processing priority utilizing content ingest management tools, supporting an ACR process for writing fingerprints to the fingerprint database 220, and supporting administration tools utilized for monitoring and reporting.

The fingerprint database 220, which may also be referred to as a central fingerprint database, for example, may comprise suitable logic, circuitry, code, and/or interfaces that may be operable to store fingerprints captured by the offline fingerprint ingest server 214 and maintain the association between the captured fingerprints and a particular CID and media time.

In an embodiment of the invention, the fingerprint database 220 may support queries from multiple monitor applications 224. For example and without limitation, as many as 50 monitor applications 224 may query the fingerprint database 220. In response to a query, the fingerprint database 220 may return a CID and a media time associated with the fingerprint in a very short period of time, typically in less than one second. For example and without limitation, the return time by the fingerprint database 220 may be less than 10 milliseconds.

The fingerprint database 220 may also be operable to respond to requests from the content version comparison module 216 to identify differences between the master versions in the fingerprint database 220 and derivative works also ingested into the fingerprint database 220. For example, a movie may have different cuts or versions depending on the time of day and/or the network in which it is to be shown. The corresponding master and the derivative works may be ingested, fingerprinted, and stored in the fingerprint database 220. The interactive timeline creation module 218 may have access to the various versions of a certain work but it can identify the master version from any of the other cuts or versions. Typically, a request is initiated by the content version comparison module 216 to identify the differences (e.g., deltas) between the master and selected derivative works. A "delta" file is returned to the interactive timeline creation module 218, which incorporates the changes from the master source and automatically generates a derivative event timeline. Multiple derivative works may be compared to the master in the content version comparison module 216 to reduce the processing necessary to handle the other versions.

The fingerprint database 220 may be implemented as a distributed, fault-tolerant database that is operable to support persistent storage of fingerprints. The fingerprint database 220 may be operable to store large amounts of content fingerprints. For example and without limitation, the fingerprint database 220 may store up to 25,000 hours of content fingerprints. The number of hours of content fingerprints that can be stored may vary based on the availability of storage capacity in the fingerprint database 220.

The fingerprint database 220 may also be operable to concurrently support the reception of content from multiple offline fingerprint ingest servers 214, respond to queries from multiple monitor applications 224, and/or respond to queries from multiple content version comparison modules 216. For example and without limitation, the fingerprint database 220 may receive content from up to 10 offline fingerprint ingest servers 214. In another example and without limitation, the fingerprint database 220 may respond to queries from up to 50 monitor applications 224. In yet another example and without limitation, the fingerprint database 220 may respond to queries from up to five content version comparison modules 216. The number of requests and/or of content version comparison modules 216 that can be supported by the fingerprint database 220 may vary based on the capacity of the fingerprint database 220.

The fingerprint database 220 may be operable to support, among other features, administrative tools and report generation, management tools to report errors, and/or recoverability after a shut down or crash.

The fingerprint database 220 may be implemented utilizing multiple modules (not shown). These modules may comprise a fingerprint storage module as well as other modules that are operable to support the process of ingesting content from the offline fingerprint ingest server 214, the process of responding with a CID and media time to the monitor application module 115, and/or the process of responding to the content version comparison module 216. One or more modules may also be implemented to support administrative tools, monitoring, and/or reporting, for example.

The content version comparison module 216 may comprise suitable logic, circuitry, code, and/or interface that may be operable as a tool that enables comparison of a master version of some content to a derivative version of that same content based on fingerprints stored in the fingerprint database 220. A derivative work or piece may refer to a version of a program, promotion, or commercial, for example, that is different from a master version of that same program, promotion, or commercial. The content version comparison module 216 may return a file listing the differences between the master version and the derivative work based on a time code. The file may be provided to the interactive timeline creation module 218, for example.

The content version comparison module 216 may be operable to identify sequences that have been edited to shorten the time of handling the derivative work, the insertion of new advertisement break locations, and/or the insertion of new content. An example of the insertion of new advertisement break locations may comprise the addition of black frames of between 5 and 15 seconds. An example of the insertion of new content may occur in instances when the derivative work is the director's cut rather than the original theatrical master. The content version comparison module 216 may pass or communicate a difference file to the interactive timeline creation module 218 to be utilized for automating the creation of a new interactive timeline for a unique edit of a program based on the network, the day, and/or the time of day on which the program is to be shown.

The content version comparison module 216 may also be operable to query the fingerprint database 220 for information (e.g., fingerprints) to perform version comparison, to identify advertisement break locations based on black frames of between 5 and 15 seconds, and/or to generate an extensible markup language (XML) or similar output file that indicates the differences between a derivative piece and a master version. Moreover, the content version comparison module 216 may support, among other features, the use of administration tools and the creation of reports, the ability to generate progress reports on processing content and errors, and/or recoverability after a shut down or crash.

The content version comparison module 216 may be implemented utilizing multiple modules (not shown). These modules may be operable to perform one or more functions such as, for example, querying the fingerprint database 220 and performing file comparison. One or more modules may also be implemented to support administrative tools, for monitoring, and/or reporting, for example. The monitor application module 115 may comprise suitable logic, circuitry, code, and/or interfaces that may be operable to ingest a live broadcast television linear video feed and fingerprint the content in the feed in real time. The live broadcast television linear video feed may also be referred to as a network television feed, for example. The live broadcast television linear video feed can be based on a Serial Digital Interface (SDI) video interface and/or on a High-Definition SDI (HD-SDI) video interface. These fingerprints may be compared by the monitor application module 115 against fingerprints stored in the fingerprint database 220. When the comparison results in a fingerprint match, the fingerprint database 220 may return to the monitor application module 115 the CID and the media time of that match. The CID and the media time may then be provided to the timeline/event creation module 226. An API may be utilized to handle the communication between the monitor application module 115 and the timeline/event creation module 226.

As noted above, the monitor application module 115 may be operable to support, for example, a SDI and/or a HD-SDI for input that are provided from the broadcast chain prior to encoding and uplink. In this regard, the broadcast chain may provide the network television feed to the monitor application module 115. Other interfaces and/or formats may also be supported.

The monitor application module 115 may function so that it operates ahead of any ACR-based device or viewer device that is in the field, such as in a user's home, for example. Although the amount of time that the monitor application module 115 may be ahead from ACR-based devices in the field may vary, in a typical case the monitor application module 115 may be approximately at least 3 seconds ahead, for example.

The monitor application module 115 may be operable to query the fingerprint database 220 to determine the CID and the media time or media timeline. The monitor application module 115 may be operable to support an API that enables the monitor application module 115 to report the CID and the media time to a real-time event trigger infrastructure that is represented by the label "A" in FIG. 2A. Moreover, the monitor application module 115 may support, among other features, the use of administration tools and the creation of reports, the use of management tools for reporting errors, and/or the handling of failover/recovery operations.

The monitor application module 115 may be implemented utilizing multiple modules (not shown). These modules may comprise a module for video capture from an SDI/HD-SDI capture card, a module that provides real-time fingerprinting and querying of the fingerprint database 220, and a module that supports an API to communicate the CID, media time, and other data (e.g., duplicate CIDs, mediatime, confidence, number of seconds). One or more modules may also be implemented to support administrative tools, monitoring, and/or reporting, for example.

The timeline/event creation module 226, which may be implemented as part of the monitor application 226, may comprise suitable logic, circuitry, code, and/or interfaces that may be operable to query the interactive timeline archive 222 for events associated with the CID. The timeline/event creation module 226 may be operable to utilize the CID and the media time received by the monitor application module 115 from the fingerprint database 220 to look up event IDs in the interactive timeline archive 222. The event IDs are used to create a real-time timeline (i.e., schedule) in XML or other standard data format and real-time event triggers.

The interactive timeline creation module 218 may comprise suitable logic, circuitry, code, and/or interfaces that may be operable to utilize the proxy video generated by the content ingest module 212 and link an interactive timeline against the fingerprinted media. The interactive timeline may comprise one or more event IDs associated with a particular time in a program, commercial, or promotion. The interactive event IDs may be referred to as interactive event IDs, for example. The interactive timeline archive 222 may comprise suitable logic, circuitry, code, and/or interfaces that may be operable to store multiple interactive timelines.

In operation, the air master 210 is received and ingested by the content ingest module 212 and a proxy video is created. The highest quality proxy video generated by the content ingest module 212 may be provided to the offline fingerprint ingest server 214 while a lower quality proxy video generated by the content ingest module 212 may be provided to the interactive timeline creation module 218. The offline fingerprint ingest server 214 may fingerprint the high quality proxy video and may send the fingerprints to the fingerprint database 220 for archiving. In addition to the fingerprints, CIDs and media times may be stored in the fingerprint database 220.

The interactive timeline creation module 218 may receive the proxy video and may link event IDs that represent certain desired interactive events with the program's timeline to generate an interactive timeline. The interactive timeline may be stored in the interactive timeline archive 222.

When a derivative piece or different version from a master version is ingested, the content version comparison module 216 may compare fingerprints of the master version with fingerprints from the derivative piece to generate a difference file that is provided to the interactive timeline creation module 218. The interactive timeline creation module 218 may utilize the difference file to create an interactive timeline for the derivative piece from an interactive timeline previously generated for the master version.

The monitor application module 115 receives a network television feed and fingerprints the video content in the feed. The fingerprints generated are compared to those stored in the fingerprint database 220 to obtain CIDs media times, and potentially to act when a match is detected. The interactive timeline archive 222 may be queried to obtain event IDs associated with the CIDs. When event IDs are obtained, the timeline/event creation module 226 may generate a real-time timeline XML (or similar data format) feeds and may also generate real-time event triggers that may be communicated to a real-time event trigger infrastructure.

Referring to FIG. 2B, there is shown a portion 100b of the ACR system 100 that may comprise the RTEM 120, video RTFSs 240, 242, and 244, an audio RTFS 246, video fingerprint vendors 250, 252, and 254, and an audio fingerprint vendor 256. The number of video RTFSs and corresponding video fingerprint vendors as well as the number of audio RTFSs and corresponding audio fingerprint vendors shown in FIG. 2B are provided by way of illustration and not of limitation. More or fewer video RTFSs and corresponding video fingerprint vendors may be utilized in the ACR system 100. Similarly, the ACR system 100 may utilize more or fewer audio RTFSs and corresponding audio fingerprint vendors than those shown in FIG. 2B. The NTP server 170 of FIG. 1 is shown providing reference timing to the RTEM 120 and the RTFSs 240, 242, 244, and 246.

Also shown in FIG. 2B are various viewer devices such as connected TVs with paired devices 260 and 262, connected TVs without paired devices 264, and mobile devices 266, such as smartphones (e.g., iPhone, Android, etc.) and tablets (e.g., iPad, Samsung Galaxy, etc.). A paired device associated with the connected TVs may be a tablet, smartphone, or other like devices, for example.

The viewer devices 260 may be operable to utilize the same video fingerprinting technology (e.g., video ACR) utilized by the video RTFS 240 and supported by the video fingerprint vendor 250. The video fingerprint vendor 250 may be a vendor, manufacturer, or other third-party service provider that may comprise suitable logic, circuitry, code, and/or interfaces operable to provide hosted services over the Internet (e.g., cloud computing, etc.) for the viewer devices 260. These services may comprise video fingerprint matching as well as the delivery of any interactive event IDs associated with a match. In addition, the video fingerprint vendor 250 may provide a network television station identifier and/or network timing information (e.g., heartbeat message or NTP-based network timestamp) that may be utilized by the viewer devices 260 for ACR-related applications and/or to maintain synchronization with the network television feed. The viewer devices 260 may comprise suitable logic, circuitry, code, and/or interfaces that may be operable to take and send video fingerprints to the video fingerprint vendor 250 for matching.

The viewer devices 262 may be operable to utilize the same video fingerprinting technology utilized by the video RTFS 242 and supported by the video fingerprint vendor 252. The video fingerprinting technology utilized by the viewer devices 262 may be different from that utilized by the viewer devices 260. The video fingerprint vendor 252 may be a vendor, manufacturer, or other third-party service provider that may comprise suitable logic, circuitry, code, and/or interfaces operable to provide hosted services over the internet for the viewer devices 262. These services may comprise video fingerprint matching as well as the delivery of any interactive event IDs associated with a match. In addition, the video fingerprint vendor 252 may provide a network television station identifier and/or network timing information that may be utilized by the viewer devices 262 for ACR-related applications and/or to maintain synchronization with the network television feed. The viewer devices 262 may comprise suitable logic, circuitry, code, and/or interfaces that may be operable to take and send video fingerprints to the video fingerprint vendor 252 for matching.

The viewer devices 260 and 262 may be operable with a second device (e.g., smartphones, tablets) that may be paired to the parent device. In this regard, the second device may comprise suitable logic, circuitry, code, and/or interfaces that may be operable to take and send video and/or audio fingerprints to a corresponding video fingerprint vendor for matching or enable suitable pairing with the parent device to provide analogous functionality.

The viewer devices 264 may utilize the same video fingerprinting technology utilized by the video RTFS 244 and supported by the video fingerprint vendor 254. The video fingerprint vendor 254 may be a vendor, manufacturer, or other third-party service provider that may comprise suitable logic, circuitry, code, and/or interfaces operable to provide hosted services over the Internet for the viewer devices 264. These services may comprise video fingerprint matching as well as the delivery of any interactive event IDs associated with a match. In addition, the video fingerprint vendor 254 may provide a network television station identifier and/or network timing information that may be utilized by the viewer devices 264 for ACR-related applications and/or to maintain synchronization with the network television feed. The viewer devices 264 may comprise suitable logic, circuitry, code, and/or interfaces that may be operable to take and send video fingerprints to the video fingerprint vendor 254 for matching.

The viewer devices 266 may utilize the same audio fingerprinting technology (e.g., audio ACR) utilized by the audio RTFS 246 and supported by the audio fingerprint vendor 256. The viewer devices 266 may be referred to as second-screen devices, for example. The audio fingerprint vendor 256 may be a vendor, manufacturer, or other third-party service provider that may comprise suitable logic, circuitry, code, and/or interfaces operable to provide hosted services over the Internet for the viewer devices 266. These services may comprise audio fingerprint matching as well as the delivery of any interactive event IDs associated with a match. In addition, the audio fingerprint vendor 256 may provide a network television station identifier and/or network timing information that may be utilized by the viewer devices 260 for ACR-related applications and/or to maintain synchronization with the network television feed. The viewer devices 266 may comprise suitable logic, circuitry, code, and/or interfaces that may be operable to take and send audio fingerprints to the audio fingerprint vendor 256 for matching.

The RTFSs 240, . . . , 246 may comprise suitable logic, circuitry, code, and/or interfaces that may be operable to perform fingerprinting of content received from the network television feeds. Each video RTFS may utilize a different video fingerprinting technology or computation from that utilized by the other video RTFSs. Similarly, when more than one audio RTFS is utilized, its audio fingerprint technology or computation may be different from that utilized by the other audio RTFSs. That is, since each vendor supports a different technology for handling fingerprinting, dedicated RTFSs may be needed for each vendor and for that vendor's corresponding viewer devices. The RTFSs 240, . . . , 246 may be operable to send fingerprints, interactive event IDs, television network station identifiers, and/or network timing information to their corresponding fingerprint vendors through one or more networks (e.g., wireline networks, wireless networks) and/or by utilizing one or more communication protocols.

The RTEM 120 may comprise suitable logic, circuitry, code, and/or interfaces that may be operable to perform real-time event triggering. In this regard, the RTEM 120 may be operable to manage real-time events based on inputs from different sources. For example, the RTEM 120 may comprise a pre-recorded event trigger module 232 to provide real-time triggering from the monitor application module 115, a time-scheduled event trigger module 234 to schedule the occurrence of a trigger based on a broadcast schedule, and a live event trigger module 236, each of which is operable to handle a different type of input.

The pre-recorded event trigger module 232 may be operable to receive real-time event triggers from the timeline/event creation module 226 described above with respect to FIG. 2A. These interactive event IDs may be stored in the interactive timeline archive 222 and may be utilized by the pre-recorded event trigger module 232 to assign interactive events via defined APIs to fingerprints generated as the network television feeds are fingerprinted by the RTFSs 240, . . . , 246.

The time-scheduled event trigger module 234 may be operable to receive a network or broadcast schedule and to assign, based on the network schedule, interactive events to fingerprints generated as the network television feed is fingerprinted by the RTFSs 240, . . . , 246. The network or broadcast schedule can be in XML format or in some other structured data format, for example.

The live event trigger module 236 may be operable to received interactive event IDs assigned by an interactive director to live programming. The interactive director may be an operator that is responsible for inserting events into the live broadcast. For pre-produced content, for example, the interactive director may watch an episode and may determine when an interactive element is to take place, when to push a trivia question, when to push a fun fact, when to drive social engagement, and/or when to share a clip or post a comment. For live content, for example, the interactive director may determine when to trigger a poll question and may manage the prompting of interactive games and determine when to trigger particular questions to engage viewers in a friendly competition. For advertisement, for example, the interactive director may determine when to bring up an offer, when to prompt to prepare for interaction or interaction event, and/or determine how long to leave interactive content on screen based on frequency rules and/or time of day. When advertisement is pre-fingerprinted, for example, interactive advertisement activities may occur automatically.

The RTEM 120 may also be operable to trigger interactive events in legacy television systems and/or in web-based systems. The infrastructure provided by the RTEM 120 may support the triggering of interactive events against applications and set-top boxes (STBs) via enhanced television binary interchange format (EBIF), hypertext transfer protocol (HTTP) live streaming (HLS) via ID3 tags, and satellite delivery systems (e.g., DISH, DirectTV) via the appropriate mechanism on the corresponding STB software platform. For HLS an ID3 tag may be utilized for sending interactive event IDs, for example.

The RTEM 120 may be operable to assign interactive event IDs to particular fingerprints in a sequence of audio or video fingerprints generated by the RTFSs 240, . . . , 246. The RTEM 120 may also be operable to provide television network station identifiers and/or network timing information associated with any sequence of fingerprints.

In the example shown in FIG. 2B, the RTFSs 240, . . . , 246 may correspond to the RTFSs 122, . . . , 124, the fingerprint vendors 250, . . . , 256 may correspond to the fingerprint match systems 130, and the viewer devices 260, . . . , 266 may correspond to the ACR-based devices 140, which are illustrated in FIG. 1.

In operation, the RTEM 120 may generate and/or handle one or more interactive event IDs that correspond to a particular set of fingerprints generated by the RTFSs 240, . . . , 246. The RTEM 120 may have determined the interactive event IDs based on live event inputs, time-scheduled event inputs, and/or pre-recorded event inputs. The RTEM 120 may assign or associate the interactive event IDs to their appropriate fingerprints based on the synchronization of its operation to the operation of the RTFSs 240, . . . , 246 via broadcast NTP. The RTEM 120 may also provide television network station identifiers and/or network timing information to the RTFSs 240, . . . , 246. The RTFSs 240, . . . , 246 may communicate the fingerprints, interactive event IDs, the television network station identifiers, and/or the network timing information to their corresponding fingerprint vendors.

The client or viewer devices may take and send fingerprints to their corresponding fingerprint vendors, which in turn determine whether there is a match with the fingerprints received from the RTFSs. Upon detection or determination of a match, the fingerprint vendors may return to the viewer device various pieces of information, including but not limited to network timing information and any interactive event ID that is triggered as a result of the match.

The portion 100b in FIG. 2B may illustrate the implementation of an abstraction layer that enables the ACR system 100 to assign the same interactive event identifiers to different sets of video and/or audio fingerprints that are generated from different fingerprint technologies. That is, by appropriately timing the assignment of interactive event identifiers to multiple sequences of fingerprints that are generated from the same video content but with different fingerprinting technologies, the ACR system 100 may be able to support fingerprinting technologies from multiple vendors. Such implementation may provide flexibility by enabling a vendor to update its fingerprinting technology without affecting other fingerprinting technologies. Moreover, the architecture of the ACR system 100 may provide scalability by enabling new or additional fingerprint technologies from other vendors or from the same vendors to be added and supported.

Referring to FIG. 2C, there is shown a portion 100c of the ACR system 100 that may comprise the viewer devices 260, . . . , 266 and the fingerprint vendors 250, . . . , 256 shown in FIG. 2B. Also shown are application data servers 270, an analytics module 272, a rules engine 274, a cloud-based content delivery network (CDN) 275, and a content management system (CMS) 276. In addition, FIG. 2C shows a user response module 280 and third-party partners/advertisers 282.

The application data servers 270 may comprise suitable logic, circuitry, code, and/or interfaces that may be operable to receive from a viewer device information related to an interactive event ID, a network television station, fingerprinted broadcast time, CID and additional data, and/or a device type. The information may be provided by the viewer device in response to a match between a fingerprint taken by the device and a fingerprint taken by the corresponding RTFS. Once a match occurs and the viewer device obtains the appropriate information from its corresponding fingerprint vendor, the viewer device may communicate the information to the application data servers 270, which in turn returns the appropriate content that corresponds to the interactive event ID and related data in a callback. Content may be pushed to a second screen or device paired with a connected TV that is logged in to an appropriate application or Web page.

The application data servers 270 may be operable to send information to the analytics module 272 as to what kind of interactions (e.g., clicks, selections, options, viewing behavior on a given broadcaster's network) are taking place in a viewer device. The application data servers 270 may be operable to handle the flow of user response data with third-party partners and/or advertisers 282. The user response data may comprise, but need not be limited to, TV IDs, coupon IDs, and event IDs, for example. Communication of the user response data between the application data servers 270 and the third-party partners/advertisers 282 may be handled by the user response module 280, for example. The application data servers 270 may be operable to call the CMS 276 for text, banners, graphics, overlays, and/or video, for example.

The application data servers 270 may also be operable to deliver event schedules to viewer devices, to deliver correct content uniform resource locator (URL) based on the type of viewer device, to integrate with a variety of back-end systems, to integrate with polling servers (not shown), to integrate with gaming services such as leader boards, and/or to integrate with customer databases such as those used in connection with store user preferences and social circle members, for example. With respect to integrating with back-end systems, the application data servers 270 may, for example, integrate with social networks for storage of tweets for later playback and/or to filter comments and push back to applications.

The rules engine 274 may comprise suitable logic, circuitry, code, and/or interfaces that may be operable to determine which platforms (e.g., viewer devices) are to be served and when are those platforms to be served by the application data servers 270. The rules engine may be preconfigured and/or dynamically configured.

The CMS 276 may comprise suitable logic, circuitry, code, and/or interfaces that may be operable to store the content that is delivered to the viewer devices. For example, content that may be delivered may comprise text, banners, graphics, overlays, and video. Other examples of content may comprise polls and fun facts, clips to share, games and trivia, and advertising content. These examples are provided by way of illustration and not of limitation. Accordingly, other examples of contents that may be utilized for user interactive events with the viewer devices may also be stored in the CMS 276.

The CMS 276 may comprise suitable logic, circuitry, code, and/or interfaces that may be operable to enable communication between the application data servers 270 and the CDN 275. The CMS 276 is operable to post assets to the CDN 275. ACR-based devices are operable to download the assets (graphics, banners, overlays, video, etc) from the CDN 275.

The analytics module 272 may comprise suitable logic, circuitry, code, and/or interfaces that may be operable to receive user interaction information from the application data servers 270 or directly from the viewing devices. The analytics module 272 may comprise one or more back-end databases to store, mange, and/or process user information.

In operation, content may be provided by the application data servers 270 to one of the viewer devices 260, ..., 266 in response to receiving an interactive event ID, a network television station, device type, and other data from that viewer device. Rules regarding which viewer device is to be served, and when the device may be served, may be determined by the rules engine 274. The content to be served by the application data servers 270 to the viewer device may be stored in the CMS 276.

The analytics module 272 may determine which viewers are interacting with content and what those viewers are watching based on information received from the application data servers 270 or directly from the viewing devices. Viewer responses that result from interactive events may be handled by the user response module 280, which in turn communicates with third-party partners/advertisers 282.

The third-party partners/advertisers 282 may comprise and/or be connected to advertisement servers and/or one or more fulfillment systems. The advertisement servers may be utilized to deliver advertisement overlays to ACR-based applications running on viewer devices. The advertisement servers may also be operable to support the tracking of user impressions and click-throughs and/or to perform other advertising-related functions.

Figure 3:
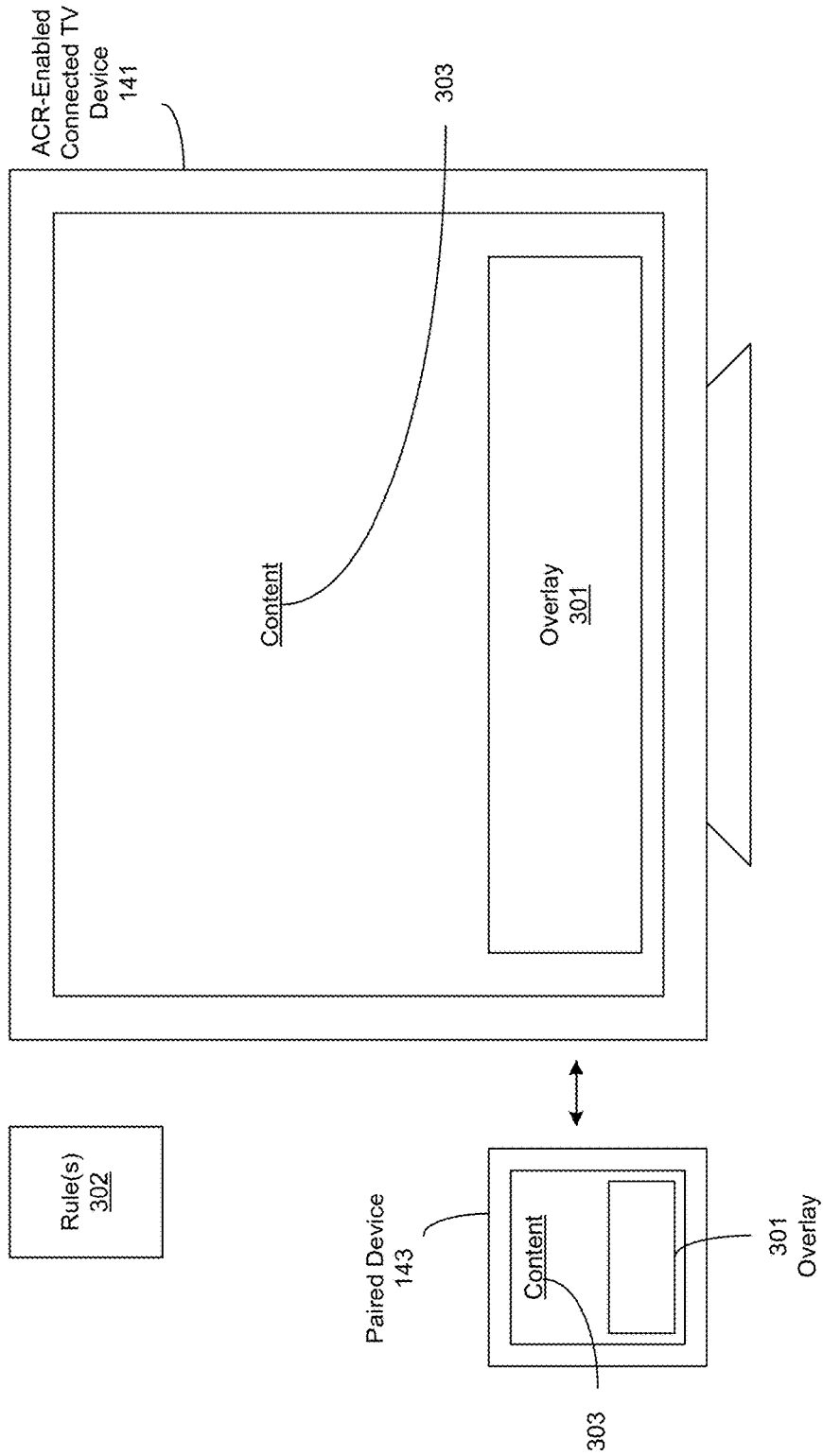
FIG. 3 is a block diagram illustrating an exemplary presentation of overlay based on one or more rules, in accordance with an embodiment of the invention.

The fulfillment systems may utilize one or more technologies to fulfill viewer requests that occur in connection with ACR-based applications and user interaction. Examples of such technologies may comprise, but need not be limited to, coupon delivery technologies, technologies for movie ticket purchases and delivery, and/or short message service/multimedia messaging service (SMS/MMS) gateways FIG. 3 is a block diagram illustrating an exemplary presentation of overlay based on one or more rules, in accordance with an embodiment of the invention. Referring to FIG. 3, there is shown an ACR-enabled connected TV device 141 presenting or displaying content 303 and an overlay 301, and one or more rules 302. The ACR-enabled connected TV device 141 may be paired with or associated with a paired device 143. The ACR-enabled connected TV device 141 and the paired device 143 are described with respect to FIG. 1A.

In an exemplary operation, the ACR-enabled connected TV device 141 may be operable to present content 303. The content 303 may be provided or associated with a network provider such as the network provider 102. The content may comprise, for example, a program, a movie, a game or a commercial. The ACR module 142 in the ACR-enabled connected TV device 141 may be operable to present, utilizing the ACR system 100, an overlay such as the overlay 301 during presentation of content 303, based on one or more rules 302. In this regard, the one or more rules 302 may be implemented utilizing information provided by the ACR system 100. The overlay 301 may be an overlay associated with a sponsor such as the sponsor 108, for example. In this regard, the one or more rules may comprise, for example, a timing rule, an advertisement separation rule, an advertisement conflict rule and/or an auto-scaling rule.

The overlay 301 may comprise, for example, interactive content for viewer interaction such as, for example, for the viewer 106 to interact. In this regard, the one or more rules 302 may comprise, for example, a viewer interaction rule. In instances when the ACR-enabled connected TV device 141 is paired with or associated with the paired device 143 utilizing the companion application 144 downloaded in and running on the paired device 143, the content 303 and the overlay 301 may also be presented on the paired device 143.

Figure 4:
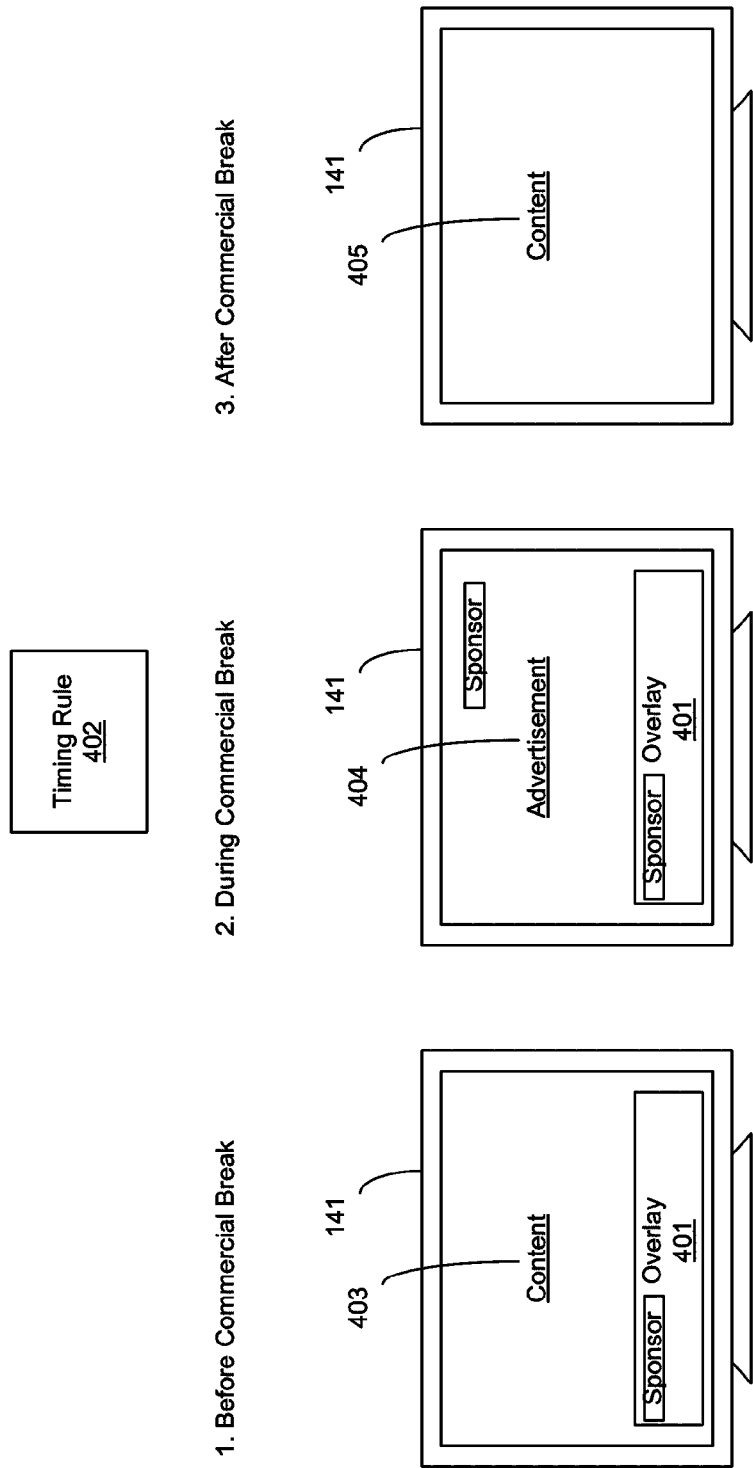
FIG. 4 is a block diagram illustrating an exemplary presentation of overlay based on a timing rule, in accordance with an embodiment of the invention.

FIG. 4 is a block diagram illustrating an exemplary presentation of overlay based on a timing rule, in accordance with an embodiment of the invention. Referring to FIG. 4, there is shown a timing rule 402 and an ACR-enabled connected TV device 141 presenting content 403 and an Overlay 401, before a commercial break. The ACR-enabled connected TV device 141 is described with respect to FIG. 1A. The overlay 401 is associated with a sponsor such as the sponsor 108. There is also shown the ACR-enabled connected TV device 141 presenting an advertisement 404 and the Overlay 401, during the commercial break, where the advertisement 404 is sponsored by the sponsor 108. There is also shown the ACR-enabled connected TV device 141 presenting content 405 without the overlay 401, after the commercial break.

In an exemplary operation, the timing rule 402 ensures that, in instances when an up-coming advertisement such as the advertisement 404 is sponsored by the sponsor 108, the presented overlay 401 may not be allowed to stay up across ending boundary of the up-coming advertisement 404. In other words, the presented overlay 401 may not extend beyond the end of the up-coming advertisement 404. In such instances, for example, before the commercial break, the ACR module 142 in the ACR-enabled connected TV device 141 may be operable to present, utilizing the ACR system 100, the overlay 401 associated with the sponsor 108 during the presentation of the content 403. During the commercial break, the overlay 401 may stray during the commercial break while the advertisement 404 is being presented. The timing rule 402 ensures that when the commercial break ends, the overlay 401 also ends. Therefore, after the commercial break, the content 405 is being presented without the overlay 401.

Figure 5:
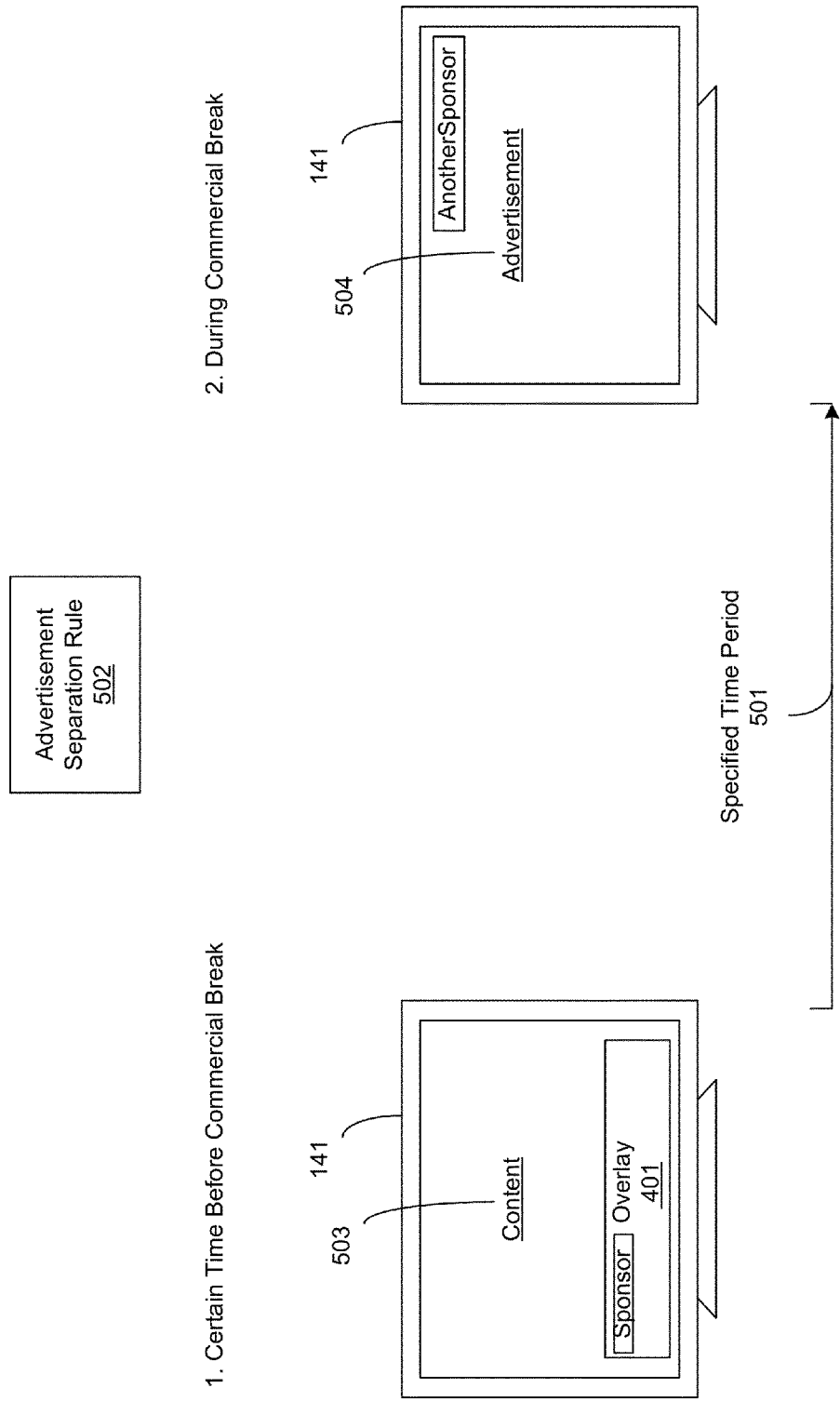
FIG. 5 is a block diagram illustrating an exemplary presentation of overlay based on an advertisement separation rule, in accordance with an embodiment of the invention.

FIG. 5 is a block diagram illustrating an exemplary presentation of overlay based on an advertisement separation rule, in accordance with an embodiment of the invention. Referring to FIG. 5, there is shown an advertisement separation rule 502 and an ACR-enabled connected TV device 141 presenting content 503 and an overlay 401, certain time before a scheduled commercial break. The ACR-enabled connected TV device 141 is described with respect to, for example, FIG. 1A. The overlay 401 may be associated with a sponsor such as the sponsor 108. There is also shown the ACR-enabled connected TV device 141 presenting an advertisement 504, during the commercial break, where the advertisement 504 is sponsored by another sponsor 108. There is also shown a specified time period 501 between the presented overlay 401 and the scheduled advertisement 504.

In an exemplary operation, the advertisement separation rule 502 determines and provides an indication on whether to present the overlay 401 associated with the sponsor 108 based on a competing advertisement such as the advertisement 504, which may be sponsored by another sponsor 109, that is scheduled to be presented in a commercial break within a certain time period such as the specified time period 501. In this regard, for example, the ACR module 142 in the ACR-enabled connect TV device 141 may detect, utilizing the ACR system 100, that the overlay 401 is associated with a car manufacturer and the scheduled advertisement 504 is sponsored by another car manufacturer. The Advertisement separation rule 502 ensures that within a specified time period 501 such as, for example, within 15 minutes before the scheduled advertisement 504, the overlay 401 will not be presented. In such instances, for example, when the scheduled commercial break is detected to be less than 15 minutes apart from the scheduled overlay 401, by the ACR module 142 in the ACR-enabled connected TV device 141, utilizing the ACR system 100, the scheduled presentation of the overlay 401 may not be allowed.

Figure 6:
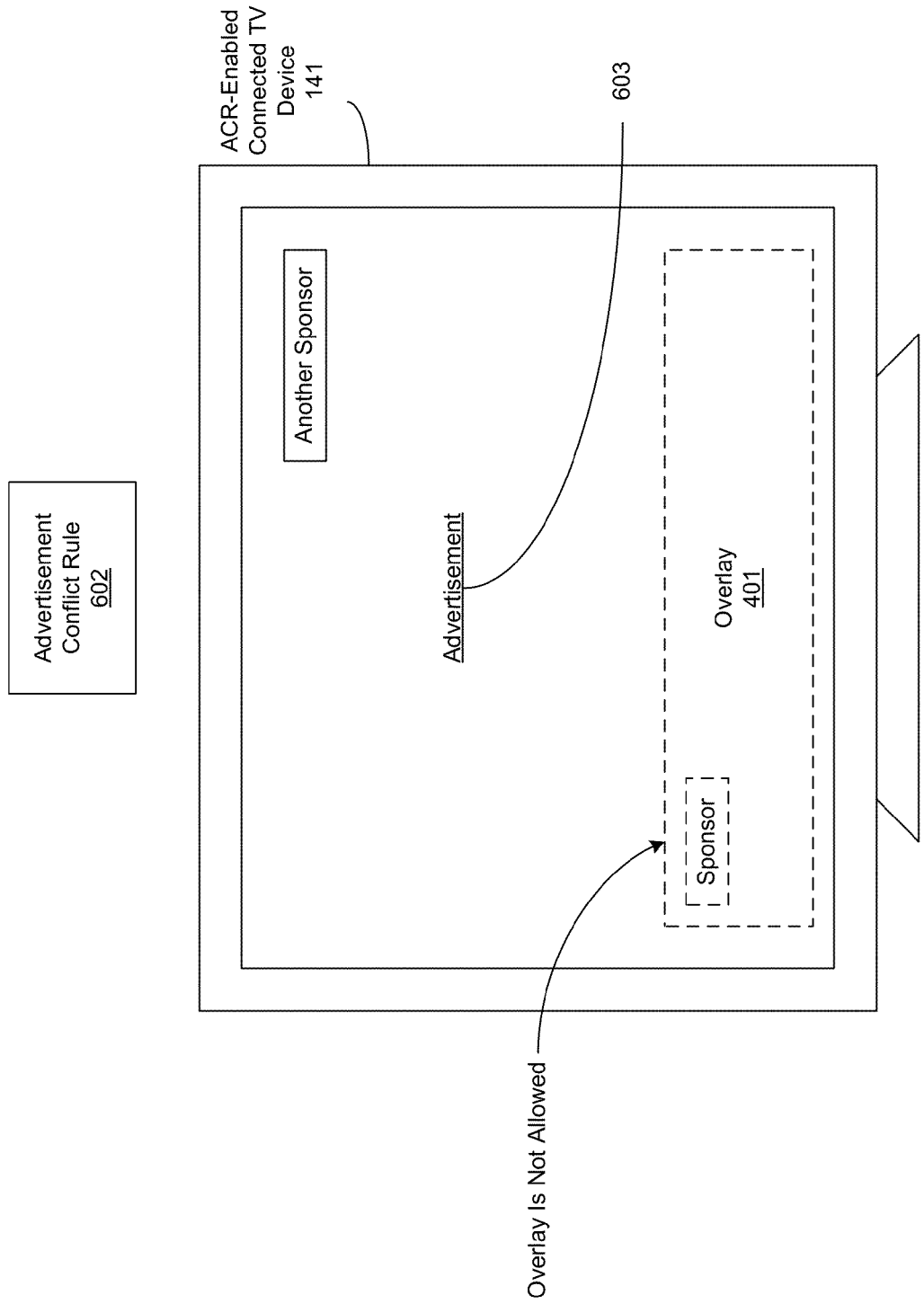
FIG. 6 is a block diagram illustrating an exemplary presentation of overlay based on an advertisement conflict rule, in accordance with an embodiment of the invention.

FIG. 6 is a block diagram illustrating an exemplary presentation of overlay based on an advertisement conflict rule, in accordance with an embodiment of the invention. Referring to FIG. 6, there is shown an advertisement conflict rule 602 and an ACR-enabled connected TV device 141 presenting an advertisement 603, which may be sponsored by another sponsor 109, during a commercial break. The ACR-enabled connected TV device 141 is described with respect to FIG. 1A.

In an exemplary operation, the advertisement conflict rule 602 ensures that, in instances when the advertisement 602 sponsored by another sponsor 109 is scheduled to be presented during a commercial break, an overlay such as the overlay 401 which is associated with the sponsor 108 may not be allowed to be scheduled and presented during the commercial break. In this regard, for example, the overlay 401 associated with a car manufacturer may be scheduled to be presented during the commercial break. The ACR module 142 in the ACR-enabled connected TV device 141 may be operable to detect, utilizing the ACR system 100, that the advertisement 603 associated with another car manufacturer is scheduled to be presented during the same commercial break. In such instances, the scheduled presentation of the overlay 401 may not be allowed. In other instances, the overlay may be permitted but the conflicting sponsor may be omitted.

Figure 7:
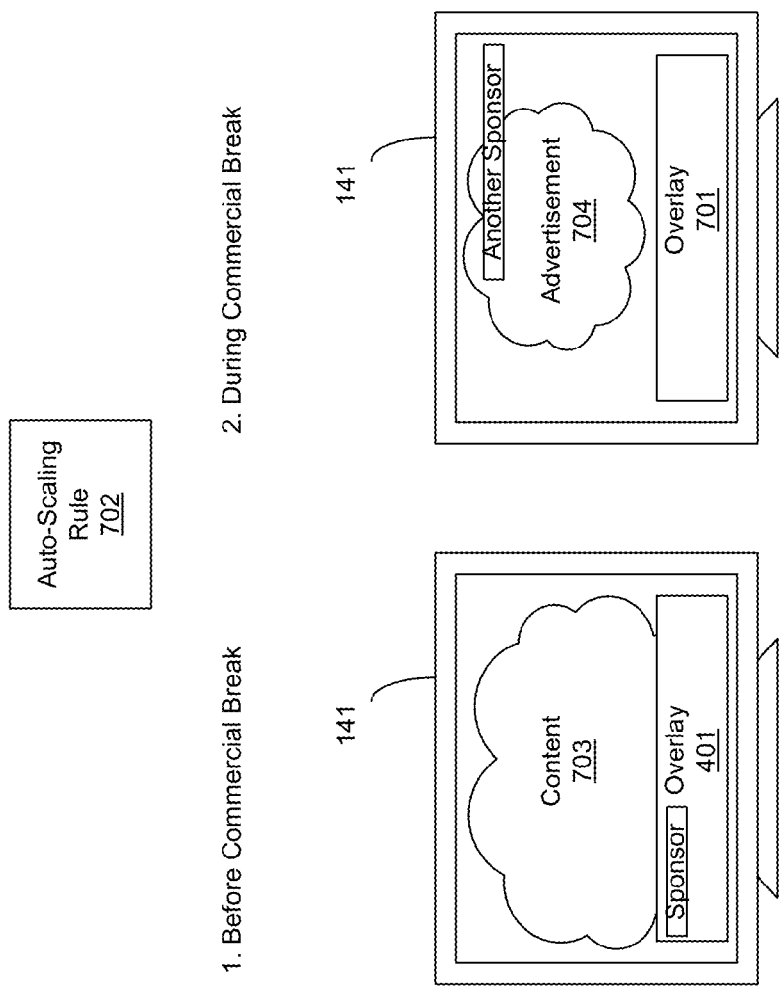
FIG. 7 is a block diagram illustrating an exemplary presentation of overlay based on an auto-scaling rule, in accordance with an embodiment of the invention.

FIG. 7 is a block diagram illustrating an exemplary presentation of overlay based on an auto-scaling rule, in accordance with an embodiment of the invention. Referring to FIG. 7, there is shown an auto-scaling rule 702 and an ACR-enabled connected TV device 141 presenting content 703 and an overlay 401, before a commercial break. The overlay 401 may be associated with a sponsor such as the sponsor 108. The ACR-enabled connected TV device 141 is described with respect to FIG. 1A. There is also shown the ACR-enabled connected TV device 141 presenting a scaled advertisement 704 and an overlay 701, during the commercial break. Another sponsor 109, other than the sponsor 108, may be the sponsor of the scaled advertisement 704. The overlay 701 may be the same as the overlay 401 except for the sponsorship information associated with the sponsor 108.

In exemplary operation, the auto-scaling rule 702 ensures that in instances when the overlay 401 associated with the sponsor 108 may stay up or be presented into a commercial break during which a competing advertisement sponsored by another sponsor 109 is presented, the competing advertisement may be scaled, based on the overlay 401, so that the scaled competing advertisement such as the scaled advertisement 704 is not covered by the overlay 701. Additionally, information indicating the sponsor 108 may be removed from the overlay 701 to avoid competing messages during the commercial break. In this regard, for example, the overlay 401 may be associated with a car manufacturer and the competing advertisement may be detected to be sponsored by another car manufacturer during the commercial break. The sponsorship of the competing advertisement may be detected by the ACR module 142 in the ACR-enabled connected TV device 141, utilizing the ACR system 100. The ACR module 142 in the ACR-enabled connected TV device 141 may be operable to identify, utilizing the ACR system 100, certain portion of the competing advertisement that is to be covered by the overlay 401 during the commercial break. In such instances, the competing advertisement may be scaled, by the ACR module 142 in the ACR-enabled connected TV device 141, based on the identification, so that the scaled advertisement 704 is not covered by the overlay 701. The information indicating the car manufacturer may be removed from the overlay 701, by the ACR module 142 in the ACR-enabled connected TV device 141, to avoid presenting competing messages during the commercial break.

Figure 8:
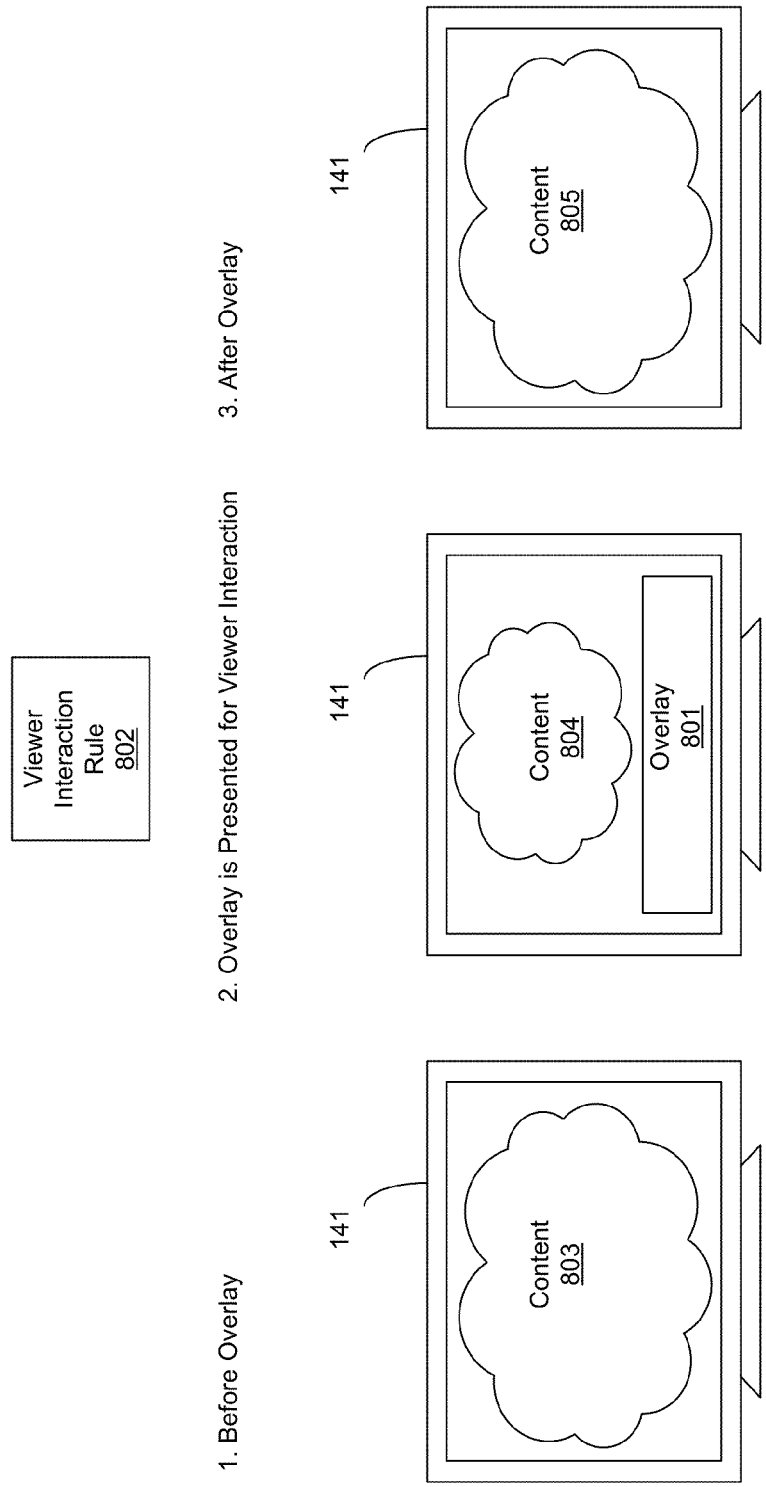
FIG. 8 is a block diagram illustrating an exemplary presentation of overlay based on a viewer interaction rule, in accordance with an embodiment of the invention.

FIG. 8 is a block diagram illustrating an exemplary presentation of overlay based on a viewer interaction rule, in accordance with an embodiment of the invention. Referring to FIG. 8, there is shown a viewer interaction rule 802 and an ACR-enabled connected TV device 141 presenting content 803, before an overlay presentation. The ACR-enabled connected TV device 141 is described with respect to FIG. 1A. There is also shown the ACR-enabled connected TV device 141 presenting scaled content 804, when an overlay 801 is presented. The overlay 801 may comprise interactive content for viewer interaction such as, for example, for the viewer 106 to interact. There is also shown the ACR-enabled connected TV device 141 presenting rescaled content 805, after the overlay presentation. The size of the rescaled content 805 may be the original size of the overlay 803.

In an exemplary operation, the viewer interaction rule 802 ensures that, in instances when the overlay 801 comprising the interactive content is presented, the presented content 803 may be scaled, based on the overlay 801, so that the scaled content 804 is not covered by the overlay 801. In this regard, for example, the content 803 may comprise a show with a guest on the show. The guest may be an actress in a particular movie. The overlay 801 may then comprise ticket purchase information associated with the particular movie for the viewer 106 to purchase the ticket, via interaction with the overlay 801. In such instances, the ACR module 142 in the ACR-enabled connected TV device 141 may be operable to identify, utilizing the ACR system 100, a certain portion of the presented content 803 that is to be covered by the overlay 801. In instances when the overlay 801 is presented, for example, for the viewer 106 to interact to purchase a ticket for the particular movie, the ACR module 142 in the ACR-enabled connected TV device 141 may be operable to scale the presented content 803, based on the identification, so that the scaled presented content 804 is not covered by the presented overlay 801. In instances when the presented overlay 801 ends, either due to the fact that the viewer 106 has completed the purchase of the ticket or due to a time-out, for example, the scaled presented content 804 may be rescaled back to its original size, by the ACR module 142 in the ACR-enabled connected TV device 141. A time-out may occur in instances when the viewer 106 does not interact with the presented overlay 801 within a particular time period. In this regard, the rescaled content 805 may be presented after the overlay presentation.

Figure 9:
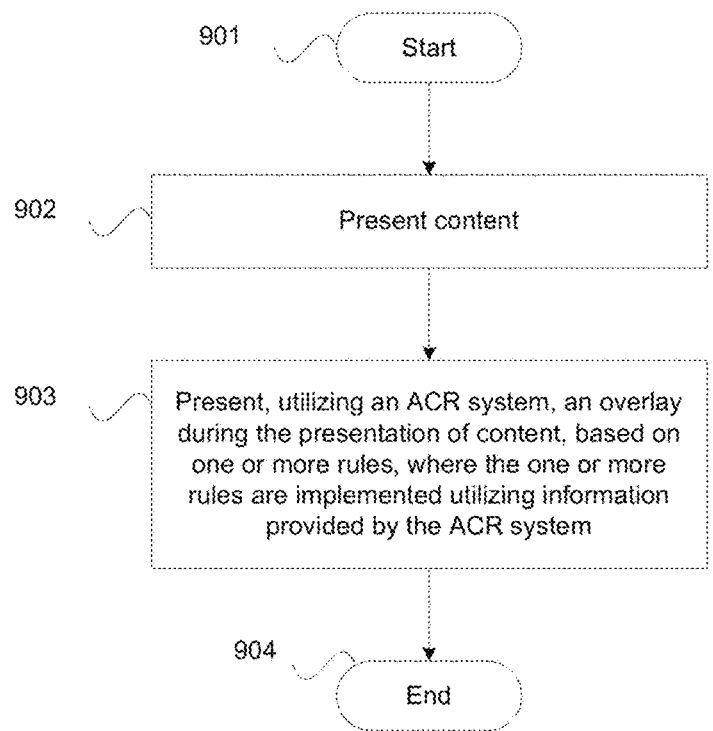
FIG. 9 is a flow chart illustrating exemplary steps for implementation of rules for overlays based on automatic content recognition, in accordance with an embodiment of the invention.

FIG. 9 is a flow chart illustrating exemplary steps for implementation of rules for overlays based on automatic content recognition, in accordance with an embodiment of the invention. Referring to FIG. 9, the exemplary steps start at step 901. In step 902, the ACR-enabled connected TV device 141 may be operable to present content such as the content 303. The content 303 may be provided or associated with a network provider such as the network provider 102. In instances when the ACR-enabled connected TV device 141 is paired with or associated with a paired device such as the paired device 143, the content 303 may also be presented on the paired device 143.

In step 903, the ACR module 142 in the ACR-enabled connected TV device 141 may be operable to present, utilizing the ACR system 100, an overlay such as the overlay 301 during the presentation of the content 303, based on one or more rules 302. The one or more rules 302 may be implemented utilizing information provided by the ACR system 100. In an exemplary embodiment of the invention, the overlay 301 may be the overlay 401, which may be associated with a sponsor such as the sponsor 108. In such instances, the one or more rules 302 may comprise, for example, a timing rule 402, an advertisement separation rule 502, an advertisement conflict rule 602 and/or an auto-scaling rule 702. In another exemplary embodiment of the invention, the overlay 301 may be the overlay 801, which comprises interactive content for viewer interaction such as, for example, for the viewer 106 to interact. In such instances, the one or more rules 302 may comprise a viewer interaction rule 802, for example. In instances when the ACR-enabled connected TV device 141 is paired with or associated with the paired device 143, the overlay 301 may also be presented on the paired device 143. The exemplary steps may proceed to the end step 904.

Figure 10:
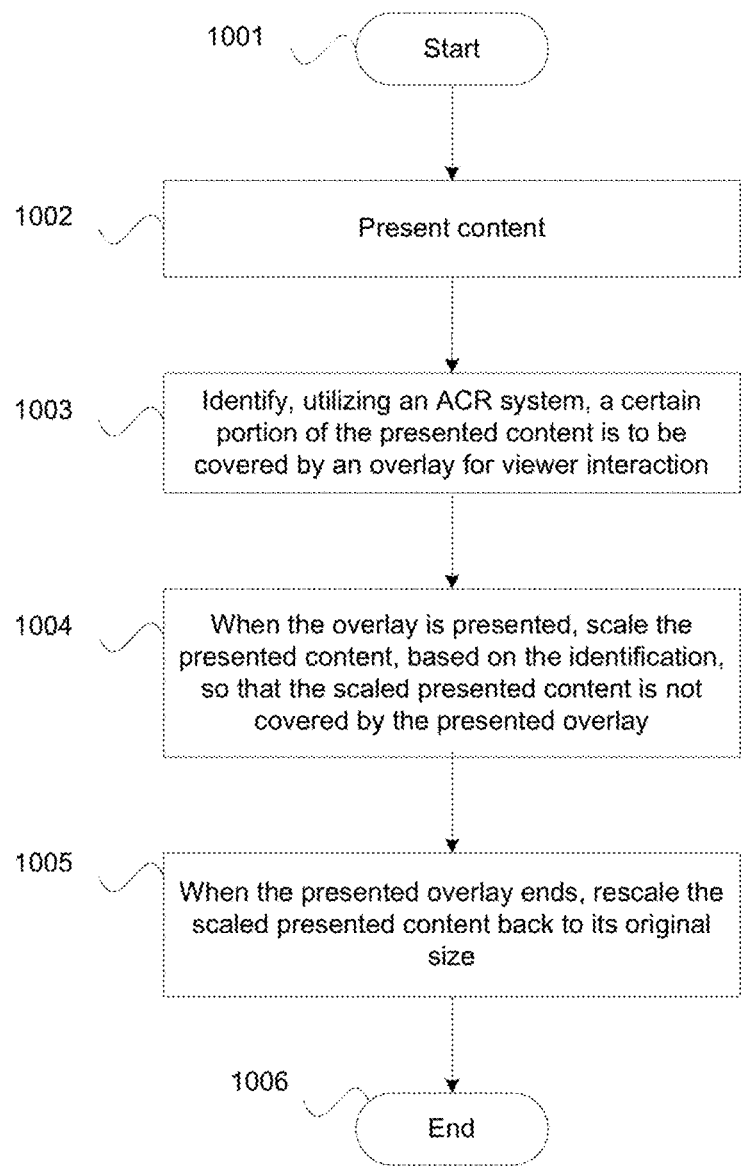
FIG. 10 is a flow chart illustrating exemplary steps for implementation of a viewer interaction rule for overlays based on automatic content recognition, in accordance with an embodiment of the invention.

FIG. 10 is a flow chart illustrating exemplary steps for implementation of a viewer interaction rule for overlays based on automatic content recognition, in accordance with an embodiment of the invention. Referring to FIG. 10, the exemplary steps start at step 1001. In step 1002, the ACR-enabled connected TV device 141 may be operable to present content such as the content 803. The content 803 may be provided or associated with a network provider such as the network provider 102. In instances when the ACR-enabled connected TV device 141 is paired with or associated with a paired device such as the paired device 143, the content 803 may also be presented on the paired device 143. In step 1003, the ACR module 142 in the ACR-enabled connected TV device 141 may be operable to identify, utilizing the ACR system 100, a certain portion of the presented content 803 is to be covered by an overlay such as the overlay 801 for viewer interaction. In this regard, the overlay 801 may comprise interactive content for a viewer such as the viewer 106 to interact.

In step 1004, in instances when the overlay 801 is presented, the ACR module 142 in the ACR-enabled connected TV device 141 may be operable to scale the presented content 803, based on the identification, so that the scaled presented content 804 is not covered by the presented overlay 801. In instances when the ACR-enabled connected TV device 141 is paired with or associated with the paired device 143, the overlay 801 may also be presented on the paired device 143. In step 1005, in instances when the presentation of the overlay 801 ends, the ACR module 142 in the ACR-enabled connected TV device 141 may be operable to rescale the scaled presented content 804 back to its original size. In this regard, the rescaled content such as the content 805 may be presented after the presentation of the overlay 801. The exemplary steps may proceed to the end step 1006.

In various embodiments of the invention, an ACR-enabled connected TV device 141 coupled to an ACR system 100 may be operable to present content such as the content 303. The ACR module 142 in the ACR-enabled connected TV device 141 may be operable to present, utilizing the ACR system 100, an overlay such as the overlay 301 during the presentation of the content 301, based on one or more rules 302. In this regard, the one or more rules 302 may be implemented utilizing information provided by the ACR system 100. In instances when the ACR-enabled connected TV device 141 is paired with or associated with the paired device 143 utilizing the companion application 144 downloaded in and running on the paired device 143, the content 303 and the overlay 301 may also be presented on the paired device 143.

In an exemplary embodiment of the invention, the presented overlay such as the overlay 401 may be associated with a sponsor such as the sponsor 108. In this regard, the one or more rules 302 may comprise, for example, a timing rule 402 which ensures that, in instances when an up-coming advertisement such as the advertisement 404 is sponsored by the sponsor 108, the presented overlay 401 may not be presented beyond the end of the boundary of the up-coming advertisement 404. The one or more rules 302 may comprise, for example, an advertisement separation rule 502, which indicates whether to present the overlay 401 associated with the sponsor 108 based on a competing advertisement such as the advertisement 504 that may be sponsored by another sponsor 109 and is scheduled to be presented in a commercial break within a specified time period 501. The one or more rules 302 may comprise, for example, an advertisement conflict rule 602 which ensures that, in instances when the presented content 303 comprises a competing advertisement such as the advertisement 603 sponsored by another sponsor 109 during a commercial break, the overlay 401 associated with the sponsor 108 may be blocked from being presented during the commercial break. The one or more rules 302 may also comprise, for example, an auto-scaling rule 702 which ensures that, in instances when the overlay 401 associated with the sponsor 108 stays up or is presented into a commercial break during which a competing advertisement sponsored by another sponsor 109 is presented, the competing advertisement may be scaled, based on the overlay 401. The scaling may be done so that the scaled competing advertisement, such as the scaled advertisement 704, is not covered by the overlay 701. Furthermore, information indicating the sponsor 108 may be removed from the overlay 701 to avoid presenting competing messages during the commercial break.

In some embodiments of the invention, an ad server such as the ad server 107, which may be coupled to the ACR system 100, may be operable to determine whether the overlay 401 associated with the sponsor 108 may be appropriate to be presented. In this regard, the ad server 107 may provide the determination based on the one or more rules 302 and on one or more advertising schedules for commercial breaks.

In an exemplary embodiment of the invention, the presented overlay such as the overlay 801 may comprise interactive content for viewer interaction such as for example, for the viewer 106 to interact. In this regard, the one or more rules 302 may comprise, for example, a viewer interaction rule 802 which ensures that, in instances when the overlay 801 comprising the interactive content is presented, the presented content such as the content 803 may be scaled, based on the overlay 801. In this regard, the scaling may be done so that the scaled presented content 804 is not covered by the overlay 801. To implement the viewer interaction rule 802, the ACR module 142 in the ACR-enabled connected TV device 141 may be operable to identify, utilizing the ACR system 100, a certain portion of the presented content 803 that is to be covered by the overlay 801. In instances when the overlay 801 is presented, the ACR module 142 in the ACR-enabled connected TV device 141 may be operable to scale the presented content 803, based on the identification, so that the scaled presented content 804 is not covered by the presented overlay 801. In instances when the presented overlay 801 ends or is no longer presented, the ACR module 142 in the ACR-enabled connected TV device 141 may be operable to rescale the scaled presented content 804 back to its original size.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for implementation of rules for overlays based on automatic content recognition.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in an automatic content recognition (ACR)-enabled connected TV device, wherein:
      said ACR-enabled connected TV device comprises an ACR module that communicates with an ACR system that is external to said ACR-enabled connected TV device, and said ACR system comprises an abstraction layer that supports different video fingerprint technologies from multiple vendors;
      said ACR module providing fingerprints to said ACR system for matching; and
      said ACR module receiving information and/or content from said ACR system based on said matching:
   presenting by said ACR module, utilizing an ACR system, an overlay during presentation of content, based on one or more rules, wherein:
      said one or more rules are implemented by said ACR module utilizing information provided by said ACR system, and
      when said ACR-enabled connected TV device is paired with a paired device utilizing a companion application running on said paired device, said content and said overlay are also presented on said paired device.

2. The method according to claim 1, wherein said presented overlay is associated with a sponsor.

3. The method according to claim 2, wherein said one or more rules comprises a timing rule which ensures that, when an up-coming advertisement is sponsored by said sponsor, said presented overlay does not extend beyond the end of said up-coming advertisement.

4. The method according to claim 2, wherein said one or more rules comprises an advertisement separation rule, which indicates whether to present said overlay associated with said sponsor based on a competing advertisement that is sponsored by another sponsor and said competing advertisement is scheduled to be presented in a commercial break within a specified time period.

5. The method according to claim 2, wherein said one or more rules comprises an advertisement conflict rule, which ensures that, when said presented content comprises a competing advertisement, which is sponsored by another sponsor, and said competing advertisement is to be presented during a commercial break, said overlay associated with said sponsor is blocked from being presented during said commercial break.

6. The method according to claim 2, wherein said one or more rules comprises an auto-scaling rule, which ensures that, when said overlay associated with said sponsor is presented into a commercial break during which a competing advertisement sponsored by another sponsor is presented, said competing advertisement is scaled, based on said overlay, so that said scaled competing advertisement is not covered by said overlay, and information indicating said sponsor is removed from said overlay to avoid presenting competing messages during said commercial break.

7. The method according to claim 2, wherein an ad server coupled to said ACR system determines whether said overlay associated with said sponsor is appropriate for presentation based on said one or more rules and on one or more advertising schedules for commercial breaks.

8. The method according to claim 1, wherein said presented overlay comprises interactive content for viewer interaction.

9. The method according to claim 8, wherein said one or more rules comprises a viewer interaction rule which ensures that, when said overlay comprising said interactive content is presented, said presented content is scaled based on said overlay, and said scaling is done so that said scaled presented content is not covered by said overlay.

10. The method according to claim 9, comprising:
    identifying by said ACR module, utilizing said ACR system, a certain portion of said presented content that is to be covered by said overlay;
    when said overlay is presented, scaling said presented content, based on said identification, so that said scaled presented content is not covered by said presented overlay; and
    when said presented overlay ends, rescaling said scaled presented content back to its original size.

11. A system, comprising:
    an automatic content recognition (ACR)-enabled connected TV device, wherein:
        said ACR-enabled connected TV device comprises an ACR module that communicates with an ACR system that is external to said ACR-enabled connected TV device, and said ACR system comprises an abstraction layer that supports different video fingerprint technologies from multiple vendors;
        said ACR module providing fingerprints to said ACR system for matching; and
        said ACR module receiving information and/or content from said ACR system based on said matching, said ACR-enabled connected TV device being operable to:
    present by said ACR module, utilizing said ACR system, an overlay during presentation of content, based on one or more rules, wherein:
        said one or more rules are implemented by said ACR module utilizing information provided by said ACR system, and
        when said ACR-enabled connected TV device is paired with a paired device utilizing a companion application running on said paired device, said content and said overlay are also presented on said paired device.

12. The system according to claim 11, wherein said presented overlay is associated with a sponsor.

13. The system according to claim 12, wherein said one or more rules comprises a timing rule which ensures that, when an up-coming advertisement is sponsored by said sponsor, said presented overlay does not extend beyond the end of said up-coming advertisement.

14. The system according to claim 12, wherein said one or more rules comprises an advertisement separation rule which indicates whether to present said overlay associated with said sponsor based on a competing advertisement that is sponsored by another sponsor and said competing advertisement is scheduled to be presented in a commercial break within a certain time period.

15. The system according to claim 12, wherein said one or more rules comprises an advertisement conflict rule, which ensures that, when said presented content comprises a competing advertisement, which is sponsored by another sponsor, and said competing advertisement is to be presented during a commercial break, said overlay associated with said sponsor is blocked from being presented during said commercial break.

16. The system according to claim 12, wherein said one or more rules comprises an auto-scaling rule which ensures that, when said overlay associated with said sponsor is presented into a commercial break during which a competing advertisement sponsored by another sponsor is presented, said competing advertisement is scaled, based on said overlay, so that said scaled competing advertisement is not covered by said overlay, and information indicating said sponsor is removed from said overlay to avoid presenting competing messages during said commercial break.

17. The system according to claim 12, wherein an ad server coupled to said ACR system determines whether said overlay associated with said sponsor is appropriate for presentation based on said one or more rules and on one or more advertising schedules for commercial breaks.

18. The system according to claim 11, wherein said presented overlay comprises interactive content for viewer interaction.

19. The system according to claim 18, wherein said one or more rules comprises a viewer interaction rule which ensures that, when said overlay comprising said interactive content is presented, said presented content is scaled, based on said overlay, and said scaling is done so that said scaled presented content is not covered by said overlay.

20. The system according to claim 19, wherein said ACR-enabled connected TV device is operable to:
    identify by said ACR module, utilizing said ACR system, a certain portion of said presented content that is to be covered by said overlay;
    when said overlay is presented, scale said presented content, based on said identification, so that said scaled presented content is not covered by said presented overlay; and
    when said presented overlay ends, rescale said scaled presented content back to its original size.

21. A system, comprising:
    an automatic content recognition (ACR) system comprising:
        a fingerprint matching system;
        a plurality real-time fingerprint servers;
        wherein:
            said finger print matching system is communicatively coupled to said plurality of real-time fingerprint servers; and
            said ACR system comprises an abstraction layer that interfaces with said plurality real-time fingerprint servers to support different video fingerprint technologies from multiple vendors; and
        an ACR-enabled connected TV device comprising an ACR module, wherein said ACR-enabled connected TV device is communicatively coupled to said ACR system;
        wherein:
            said ACR module presents, utilizing said ACR system, an overlay during presentation of content, based on one or more rules;

said ACR module implements said one or more rules utilizing information provided by said ACR system; and when said ACR-enabled connected TV device is paired with a paired device utilizing a companion application running on said paired device, said content and said overlay are also presented on said paired device.

* * * * *